(12) United States Patent
Furuya et al.

(10) Patent No.: US 10,670,513 B2
(45) Date of Patent: Jun. 2, 2020

(54) PARTICLE DETECTING DEVICE AND METHOD FOR INSPECTING PARTICLE DETECTING DEVICE

(71) Applicant: Azbil Corporation, Chiyoda-ku (JP)

(72) Inventors: Masashi Furuya, Chiyoda-ku (JP); Daisuke Obara, Chiyoda-ku (JP)

(73) Assignee: Azbil Corporation, Chiyoda-ku (JP)

( * ) Notice: Subject to any disclaimer, the term of this patent is extended or adjusted under 35 U.S.C. 154(b) by 0 days.

(21) Appl. No.: 16/301,588

(22) PCT Filed: Apr. 4, 2017

(86) PCT No.: PCT/JP2017/014129
§ 371 (c)(1),
(2) Date: Nov. 14, 2018

(87) PCT Pub. No.: WO2017/199615
PCT Pub. Date: Nov. 23, 2017

(65) Prior Publication Data
US 2019/0285538 A1 Sep. 19, 2019

(30) Foreign Application Priority Data
May 17, 2016 (JP) ................................. 2016-098873

(51) Int. Cl.
*G01N 21/00* (2006.01)
*G01N 15/14* (2006.01)
*G01N 21/64* (2006.01)
*G01N 21/65* (2006.01)

(52) U.S. Cl.
CPC ......... *G01N 15/1436* (2013.01); *G01N 15/14* (2013.01); *G01N 21/64* (2013.01); *G01N 21/65* (2013.01)

(58) Field of Classification Search
CPC .......................... G01N 21/51; G01N 15/1434
USPC ........................................................ 356/338
See application file for complete search history.

(56) References Cited

U.S. PATENT DOCUMENTS

| 6,227,674 B1* | 5/2001 | Englander | B60R 1/082 359/850 |
| 2006/0119853 A1* | 6/2006 | Baumberg | G01N 21/658 356/445 |
| 2007/0019209 A1* | 1/2007 | Pfaff | G01R 15/241 356/511 |
| 2012/0257196 A1* | 10/2012 | Raicu | G02B 21/002 356/300 |

(Continued)

FOREIGN PATENT DOCUMENTS

| CN | 105891119 A * | 8/2016 | ......... G01N 15/1436 |
| JP | 62-58138 A | 3/1987 | |

(Continued)

OTHER PUBLICATIONS

International Search Report dated May 16, 2017 in PCT/JP2017/014129 filed Apr. 4, 2017.

*Primary Examiner* — Md M Rahman
(74) *Attorney, Agent, or Firm* — Oblon, McClelland, Maier & Neustadt, L.L.P.

(57) ABSTRACT

A particle detecting device includes an inspection light source 30, which emits inspection light, a flow cell 40, which is irradiated with the inspection light, and an oval mirror 50, which has a first focal point at a position of the flow cell 40 and has a hole 51 at an apex of the oval mirror 50.

10 Claims, 23 Drawing Sheets

(56) References Cited

U.S. PATENT DOCUMENTS

| | | | | |
|---|---|---|---|---|
| 2012/0327417 | A1* | 12/2012 | Amako | G01N 21/658 |
| | | | | 356/445 |
| 2013/0176562 | A1* | 7/2013 | Shioi | G01J 3/4412 |
| | | | | 356/301 |
| 2013/0188181 | A1* | 7/2013 | Angel | G01J 3/44 |
| | | | | 356/301 |
| 2014/0152986 | A1* | 6/2014 | Trainer | G01N 15/0205 |
| | | | | 356/336 |
| 2014/0247447 | A1* | 9/2014 | Angel | G01J 3/44 |
| | | | | 356/301 |
| 2015/0201117 | A1* | 7/2015 | Acher | G01Q 40/00 |
| | | | | 348/79 |
| 2015/0346091 | A1 | 12/2015 | Obara et al. | |
| 2016/0113507 | A1* | 4/2016 | Reza | G01N 21/1717 |
| 2016/0202124 | A1* | 7/2016 | Lambert | G01J 3/44 |
| | | | | 356/301 |
| 2016/0238512 | A1* | 8/2016 | Furuya | G01N 15/1436 |
| 2016/0289669 | A1* | 10/2016 | Fan | C12Q 1/6874 |
| 2018/0135225 | A1* | 5/2018 | Hendrickson | D06F 39/003 |
| 2018/0278202 | A1* | 9/2018 | Gostein | H02S 40/10 |

FOREIGN PATENT DOCUMENTS

| | | |
|---|---|---|
| JP | 6-229904 A | 8/1994 |
| JP | 2745568 B2 | 4/1998 |
| JP | 2004-257756 A | 9/2004 |
| JP | 2006-10585 A | 1/2006 |
| JP | 2009-145044 A | 7/2009 |
| JP | 2015-227805 A | 12/2015 |

\* cited by examiner

PARTICLE DETECTING DEVICE AND METHOD FOR INSPECTING PARTICLE DETECTING DEVICE

TECHNICAL FIELD

The present invention relates to a detection technology, and to a particle detecting device and a method for inspecting a particle detecting device.

BACKGROUND ART

A particle detecting device including a liquid particle counter or a flow cytometer includes a flow cell for allowing a fluid, which is a sample, to flow therethrough. The flow cell is transparent. When the fluid flowing through the flow cell is irradiated with inspection light, particles contained in the fluid fluoresce or cause scattered light. Fluorescence or scattered light is focused with a lens disposed adjacent to the flow cell, and detected. On the basis of detected results such as the number of times fluorescence or scattered light is detected, the intensity of detected fluorescence or scattered light, and the wavelength of detected fluorescence or scattered light, the number or type of particles contained in the fluid can be specified. For example, whether the particles are viable particles, whether the particles are resin, or whether the particles are air bubbles can be determined.

At the time of shipment or periodical inspection, a particle detecting device undergoes inspection of, for example, the position of an inspection light source, an optical path of inspection light including the incident position or the angle of incidence of inspection light on the flow cell, the focal point of inspection light, and the position of the flow cell. The positions or angle deviating from the designed values are adjusted.

For example, PTL 1 describes a method for detecting the peak of scattered light having a wavelength the same as that of a laser beam by moving a condensing lens or a capillary cell to cause the laser beam to appropriately enter the capillary cell. PTL 2 describes a method for detecting scattered light having a wavelength the same as that of a laser light beam generated by particles flowing through the flow cell by moving the position of the flow cell relative to a laser light source to adjust the position from which a laser light beam is emitted. PTL 3 describes a method for irradiating the flow cell through which particles flow with a laser light beam and capturing an image of scattered light generated by the particles and having a wavelength the same as that of the laser light beam to adjust the positions of the optical system and the flow cell.

CITATION LIST

Patent Literature

PTL 1: Japanese Patent No. 2745568
PTL 2: Japanese Unexamined Patent Application Publication No. 2004-257756
PTL 3: Japanese Unexamined Patent Application Publication No. 6-229904

SUMMARY OF INVENTION

Technical Problem

An object of the present invention is to enable provision of a particle detecting device including an oval mirror and facilitating an inspection of an optical system including a flow cell, and a method for inspecting the particle detecting device.

Solution to Problem

An aspect of the present invention provides a particle detecting device that includes (a) an inspection light source, which emits inspection light, (b) a flow cell, which is irradiated with the inspection light, and (c) an oval mirror, which has a first focal point at a position of the flow cell and has a hole at an apex of the oval mirror.

In the particle detecting device, the hole may be disposed in an area interposed between points of intersection of the oval mirror and tangents to an outer circumference of the flow cell passing through a second focal point of the oval mirror. Alternatively, the hole may be disposed in an area interposed between points of intersection of the oval mirror and tangents to an outer circumference of the flow cell passing through outer ends of a light-receiving surface of a photodetector disposed at a second focal point of the oval mirror.

In the particle detecting device, the flow cell may include a hemispherical reflective film that reflects light, and a hemispherical lens that transmits therethrough light reflected by the hemispherical reflective film.

The particle detecting device may also include an imaging device that captures an image of the flow cell through the hole of the oval mirror at the apex. The particle detecting device may also include an imaging device that captures, through the hole of the oval mirror at the apex, an image of a shape of reaction light caused by the inspection light that crosses a fluid in the flow cell. The particle detecting device may also include an inspection photodetector that detects, through the hole of the oval mirror at the apex, reaction light caused by the inspection light that crosses a fluid in the flow cell.

In the above-described particle detecting device, the fluid that is filled into the flow cell may be an appropriate liquid or a liquid containing water, and the reaction light may be Raman scattered light. Alternatively, the fluid that is filled into the flow cell may be a liquid containing fluorochrome, and the reaction light may be fluorescence. Still alternatively, the fluid that is filled into the flow cell may be a liquid containing particles, and the reaction light may be Mie scattered light.

An aspect of the present invention provides a method for inspecting a particle detecting device, the method including observing a flow cell through a hole of an oval mirror at an apex of the oval mirror, the oval mirror having a first focal point at a position of the flow cell.

In the method for inspecting a particle detecting device, the hole may be disposed in an area interposed between points of intersection of the oval mirror and tangents to an outer circumference of the flow cell passing through a second focal point of the oval mirror. The hole may be disposed in an area interposed between points of intersection of the oval mirror and tangents to an outer circumference of the flow cell passing through outer ends of a light-receiving surface of a photodetector disposed at a second focal point of the oval mirror.

In the method for inspecting a particle detecting device, the flow cell may include a hemispherical reflective film that reflects light, and a hemispherical lens that transmits therethrough light reflected by the hemispherical reflective film.

In the method for inspecting a particle detecting device, an image of the flow cell through the hole of the oval mirror at the apex may be captured. Alternatively, in the method for inspecting a particle detecting device, an image of a shape of reaction light caused by the inspection light that crosses a fluid in the flow cell may be captured through the hole of the oval mirror at the apex. Still alternatively, in the method for inspecting a particle detecting device, reaction light caused by the inspection light that crosses a fluid in the flow cell may be detected through the hole of the oval mirror at the apex.

In the above-described method for inspecting a particle detecting device, the fluid that is filled into the flow cell may be an appropriate liquid or a liquid containing water, and the reaction light may be Raman scattered light. Alternatively, the fluid that is filled into the flow cell may be a liquid containing fluorochrome, and the reaction light may be fluorescence. Still alternatively, the fluid that is filled into the flow cell may be a liquid containing particles, and the reaction light may be Mie scattered light.

Advantageous Effects of Invention

According to the present invention, a particle detecting device including an oval mirror and facilitating an inspection of an optical system including a flow cell, and a method for inspecting the particle detecting device can be provided.

DESCRIPTION OF EMBODIMENTS

Embodiments of the present invention are described below. Throughout the drawings described below, the same or similar components are denoted with the same or similar reference signs. The drawings are schematic. Thus, the specific dimensions or other properties are to be determined with reference to the following descriptions. The dimensional relationships or ratios may naturally differ between different drawings.

First Embodiment

Figure 1:
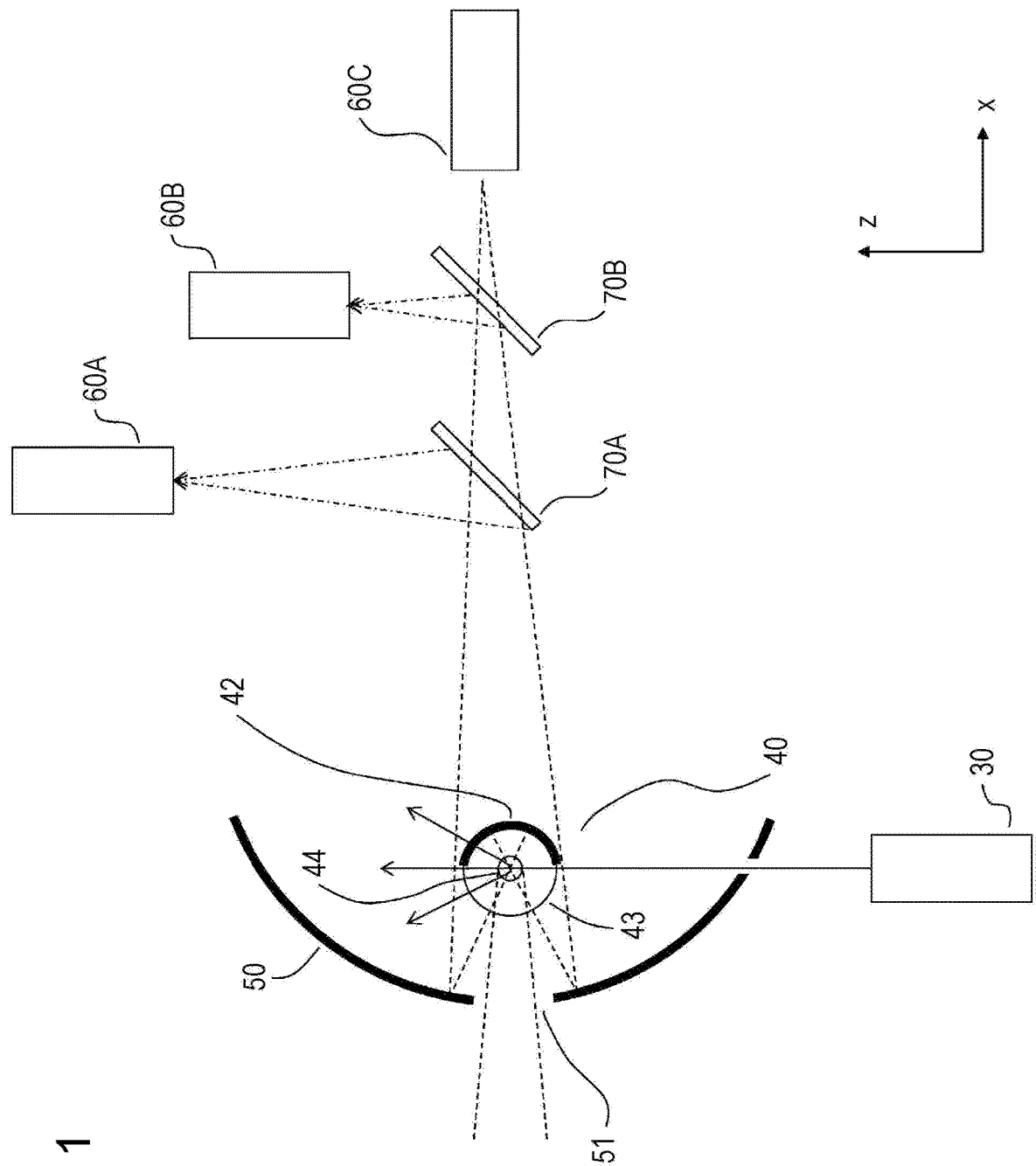
FIG. 1 is a schematic diagram of a particle detecting device according to a first embodiment of the present invention.

As illustrated in FIG. 1, a particle detecting device according to the first embodiment of the present invention includes an inspection light source 30, which emits inspection light, a flow cell 40, which is irradiated with the inspection light, and an oval mirror 50, which has a first focal point at the position of the flow cell 40 and which has a hole 51 at the apex.

Examples of particles inspected by the particle detecting device include biological matter, such as a microorganism, cells, chemical substances, and dust including waste matter and earth. Examples of a microorganism include a bacterium and a fungus. Examples of a bacterium include a Gram-negative bacterium and a Gram-positive bacterium. Examples of a Gram-negative bacterium include a colon *bacillus*. Examples of a Gram-positive bacterium include *Staphylococcus epidermidis, Bacillus subtilis, Micrococcus*, and *Corynebacterium*. Examples of a fungus include *Aspergillus* such as black mold. A microorganism is not limited to any of these examples.

Figure 2:
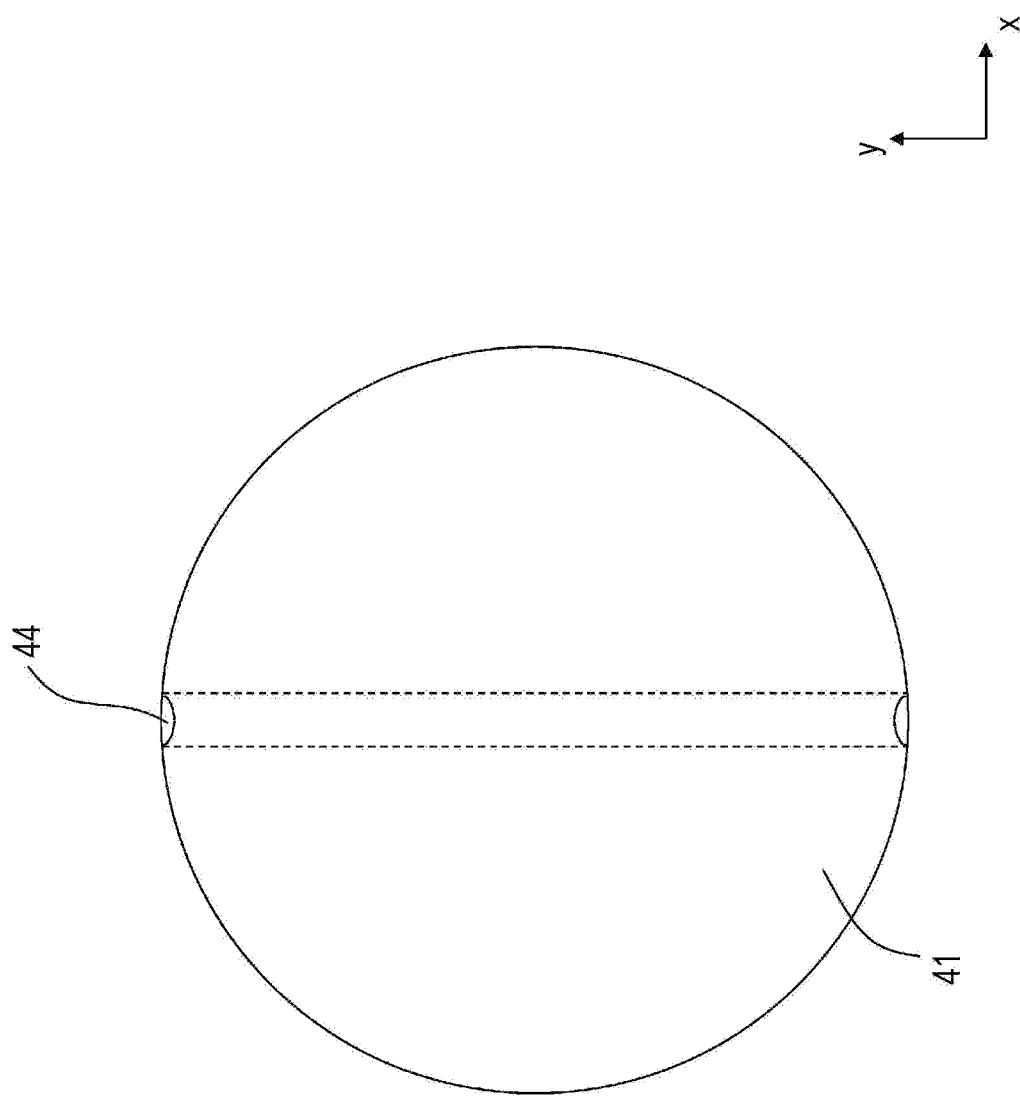
FIG. 2 is a schematic diagram of a spherical member forming a flow cell according to the first embodiment of the present invention.

As illustrated in FIG. 2, the flow cell 40 includes a transparent spherical member 41 including a through-hole 44, through which a fluid containing to-be-inspected particles flows. Here, an example of the fluid is a liquid. The surface of the transparent spherical member 41 and the inner wall of the through-hole 44 are, for example, polished. The through-hole 44 extends through the spherical member 41 at, for example, the center. The through-hole 44 has, for example, a circular cross section when taken with respect to the longitudinal direction of the through-hole 44. The through-hole 44 having a circular cross section without any angle at the inner wall can prevent air bubbles from accumulating in the through-hole 44 or prevent dirt from adhering thereto. The longitudinal direction of the through-hole 44 illustrated in FIG. 1 is perpendicular to the inspection light travel direction and perpendicular to the major axis direction of the oval mirror 50. The through-hole 44 has a diameter of, for example, smaller than 1 mm, which is not limitative. The spherical member 41 is formed of, for example, quartz glass.

Figure 3:
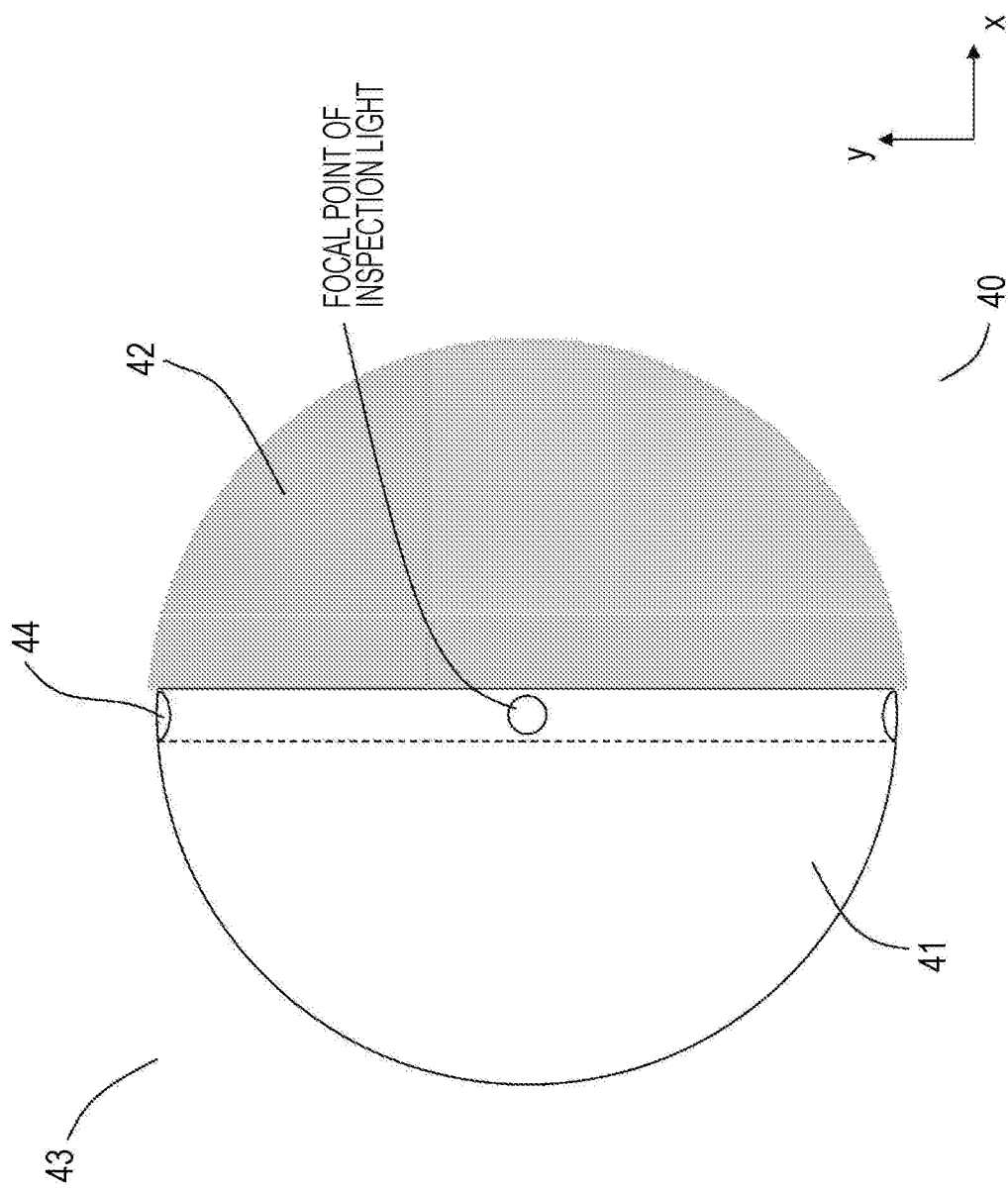
FIG. 3 is a side view of the flow cell according to the first embodiment of the present invention.
Figure 4:
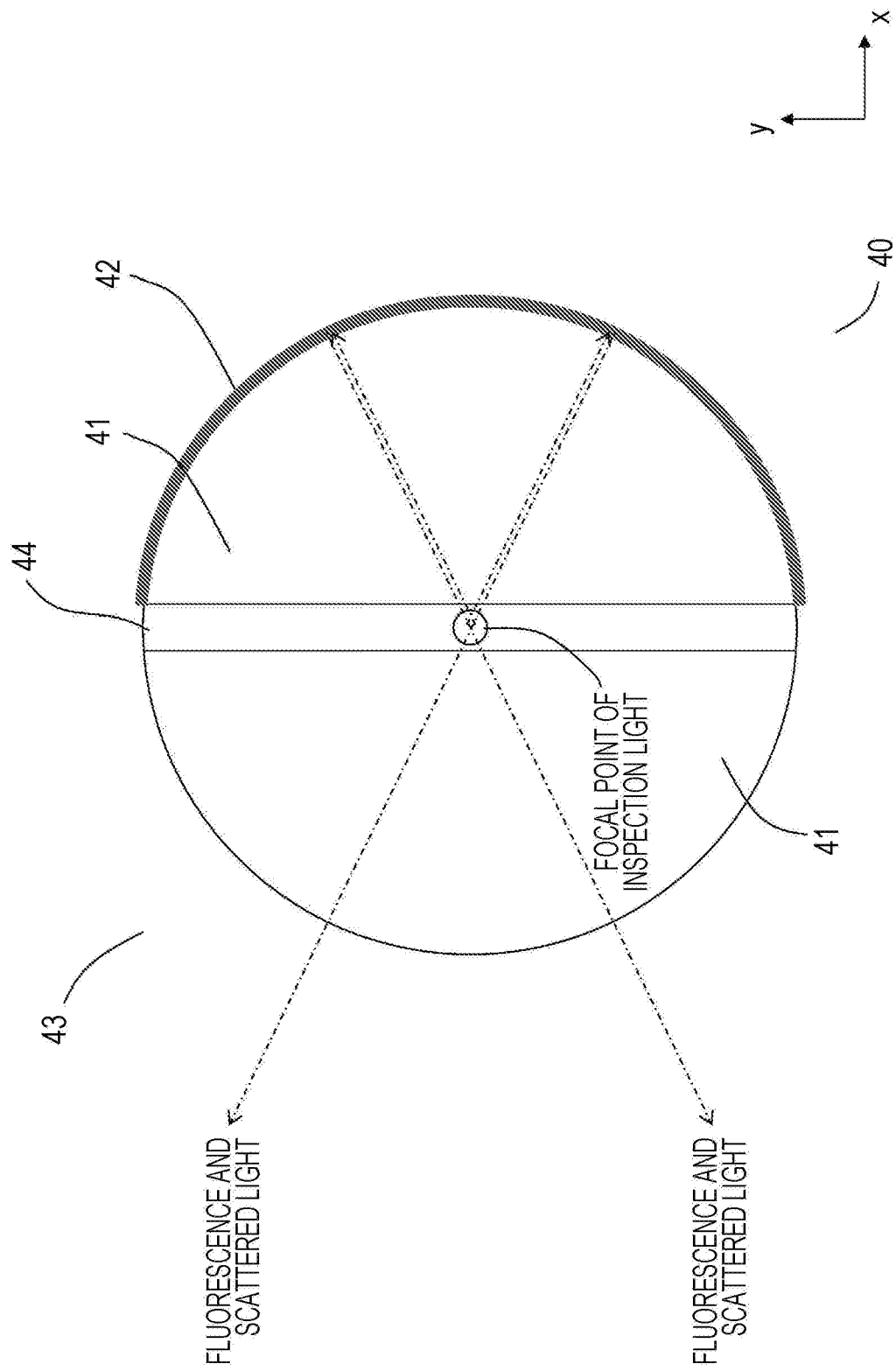
FIG. 4 is a sectional view of the flow cell according to the first embodiment of the present invention.

As illustrated in FIG. 3 and FIG. 4, the flow cell 40 includes a hemispherical reflective film 42, which covers part of the spherical member 41, for example, approximately half of the spherical member 41 with respect to the through-hole 44. The hemispherical reflective film 42 is formed of, for example, an evaporated film, and made of metal or other material. Alternatively, the hemispherical reflective film 42 may be a dielectric multilayer. The portion of the spherical member 41 not covered with the hemispherical reflective film 42 functions as a hemispherical lens 43. The hemispherical reflective film 42 and the hemispherical lens 43 face each other.

As illustrated in FIG. 1, the flow cell 40 is disposed so that the convex portion of the hemispherical lens 43 and the concave portion of the hemispherical reflective film 42 face the oval mirror 50. The flow cell 40 is disposed so that the center of the flow cell 40 through which the through-hole 44 extends coincides with the first focal point of the oval mirror 50.

When a fluid flowing through the flow cell 40 contains fluorescent particles such as a microorganism, the particles fluoresce in response to being irradiated with inspection light, serving as excitation light. Examples of substances contained in a microorganism that fluoresce include riboflavin, flavin nucleotide (FMN), flavin adenine dinucleotide (FAD), nicotinamide adenine dinucleotide phosphate (NAD (P)H), pyridoxamine, pyridoxal phosphate (pyridoxal-5'-phosphate), pyridoxine, tryptophan, tyrosine, and phenylalanine.

Inspection light for detecting fluorescent particles flowing through the flow cell 40 is emitted from the inspection light source 30 to be focused at, for example, the center of the spherical flow cell 40, coinciding a first focal point of the oval mirror 50. A light emitting diode (LED) and a laser are usable as examples of the inspection light source 30. The inspection light has a wavelength of, for example, 250 to 550 nm. The inspection light may be visible light or ultraviolet light. When the inspection light is visible light, the inspection light has a wavelength of within the range of, for example, 400 to 550 nm, and, for example, 405 nm. When the inspection light is ultraviolet light, the inspection light has a wavelength of within the range of, for example, 300 to 380 nm, and, for example, 340 nm. The wavelength of the inspection light is not limited to these examples.

Fluorescent particles fluoresce in response to being irradiated with excitation light inside the through-hole 44, serving as an inspection area. Fluorescent particles and non-fluorescent particles irradiated with the excitation light cause scattered light from, for example, Mie scattering. The scattered light resulting from Mie scattering has a wavelength the same as the wavelength of the inspection light.

The fluorescence and the scattered light caused by the particles irradiated with the inspection light are omnidirectionally emitted from the particles.

The fluorescence and the scattered light that are caused by the particles irradiated with the inspection light and that have traveled toward the hemispherical lens 43 of the flow cell 40 illustrated in FIG. 4 emerge from the surface of the hemispherical lens 43 and arrive at the oval mirror 50. When the focal point of the inspection light coincides with the center of the spherical member 41, the fluorescence and the scattered light that have occurred at the focal point of the inspection light substantially perpendicularly enter the surface of the hemispherical lens 43. The fluorescence and the scattered light thus emerge from the surface of the hemispherical lens 43 almost without being refracted at the surface of the hemispherical lens 43.

The fluorescence and the scattered light that have traveled toward the hemispherical reflective film 42 of the flow cell 40 are reflected on the hemispherical reflective film 42, emerge from the surface of the hemispherical lens 43, and arrive at the oval mirror 50. When the focal point of the inspection light coincides with the center of the spherical member 41, the fluorescence and the scattered light that have occurred at the focal point of the inspection light substantially perpendicularly enter the hemispherical reflective film 42. Thus, the fluorescence and the scattered light are substantially perpendicularly reflected on the hemispherical reflective film 42, pass substantially the center of the spherical member 41, and emerge from the surface of the hemispherical lens 43 almost without being refracted at the surface of the hemispherical lens 43.

The concave surface of the oval mirror 50 illustrated in FIG. 1 faces the concave surface of the hemispherical reflective film 42 and the convex surface of the hemispherical lens 43 of the flow cell 40. The fluorescence and the scattered light that emerge from the surface of the hemispherical lens 43 are reflected on the oval mirror 50 and focused on a second focal point of the oval mirror 50 behind the flow cell 40. For example, the oval mirror having a larger size than the hemispherical reflective film 42 of the flow cell 40 improves the efficiency of the oval mirror 50 for focusing the fluorescence and the scattered light.

Wavelength-selective reflecting mirrors 70A and 70B are disposed between the geometric first focal point and the geometric second focal point of the oval mirror 50. The wavelength-selective reflecting mirror 70A reflects, for example, scattered light resulting from Mie scattering in a wavelength selective manner. The focal point of the scattered light reflected on the wavelength-selective reflecting mirror 70A is optically equivalent to the geometric second focal point of the oval mirror 50. A photodetector 60A is disposed to detect the scattered light at the focal point of the scattered light reflected on the wavelength-selective reflecting mirror 70A. Between the wavelength-selective reflecting mirror 70A and the photodetector 60A, components such as a long-pass filter and a band-pass filter including, for example, a dielectric multilayer may be disposed.

The wavelength-selective reflecting mirror 70B reflects, for example, the fluorescence in a first wavelength range in a wavelength selective manner and transmits therethrough the fluorescence in a second wavelength range. The focal point of the fluorescence reflected by the wavelength-selective reflecting mirror 70B is optically equivalent to the geometric second focal point of the oval mirror 50. At the focal point of the fluorescence in the first wavelength range reflected by the wavelength-selective reflecting mirror 70B, a photodetector 60B that detects the fluorescence in the first wavelength range is disposed. At the focal point of the fluorescence in the second wavelength range that is transmitted through the wavelength-selective reflecting mirror 70B, a photodetector 60C that detects the fluorescence in the second wavelength range is disposed. Between the wavelength-selective reflecting mirror 70B and the photodetector 60B, and between the wavelength-selective reflecting mirror 70B and the photodetector 60C, components such as a long-pass filter and a band-pass filter including a dielectric multilayer may be disposed.

Examples usable as the wavelength-selective reflecting mirrors 70A and 70B include a dichroic mirror, an interference filter, and an optical filter. When the designed angle of incidence of the wavelength-selective reflecting mirrors 70A and 70B is 45 degrees, and the distance between the first and second focal points of the oval mirror 50 is designed so that the angle of incidence of the scattered light or fluorescence on the wavelength-selective reflecting mirrors 70A and 70B falls within 35 to 55 degrees, the interference filter has high efficiency of separation of light. However, this structure is not the only example. When an optical system disposed at a designed angle of incidence of 0 degrees includes a band-pass filter and a long-pass filter, the angle of incidence of the scattered light or fluorescence on the band-pass filter and the long-pass filter is preferably smaller than or equal to 10 degrees.

Figure 5:
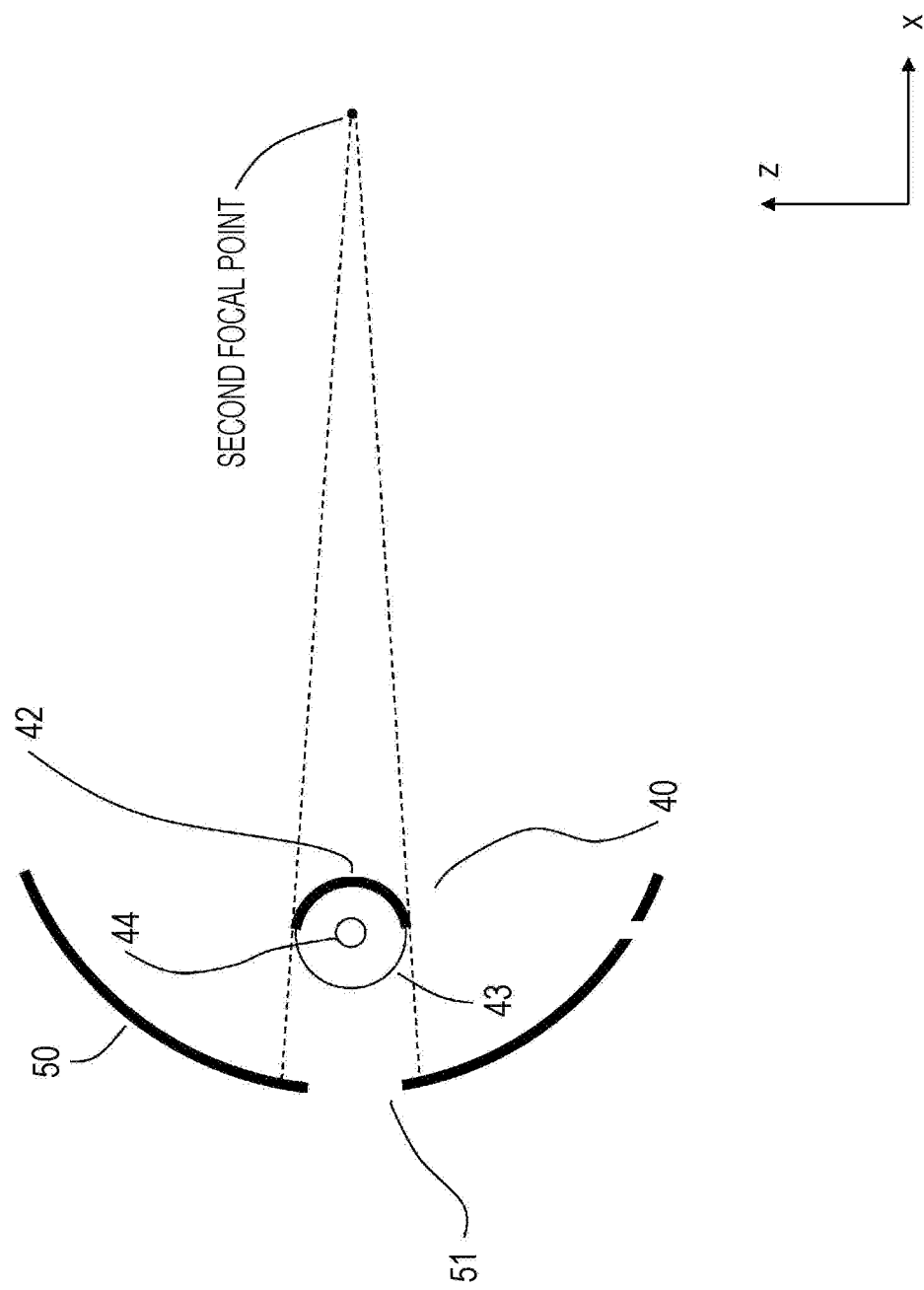
FIG. 5 is a schematic diagram of the flow cell and the oval mirror of the particle detecting device according to the first embodiment of the present invention.

As illustrated in, for example, FIG. 5, the hole 51 of the oval mirror 50 is disposed near the apex of the oval mirror 50, which is in the area interposed between the points of intersection of the oval mirror 50 and tangents to the outer circumference of the spherical flow cell 40 drawn from the second focal point of the oval mirror 50. Thus, the hole 51 is hidden behind the flow cell 40 when viewed from the second focal point of the oval mirror 50.

Figure 6:
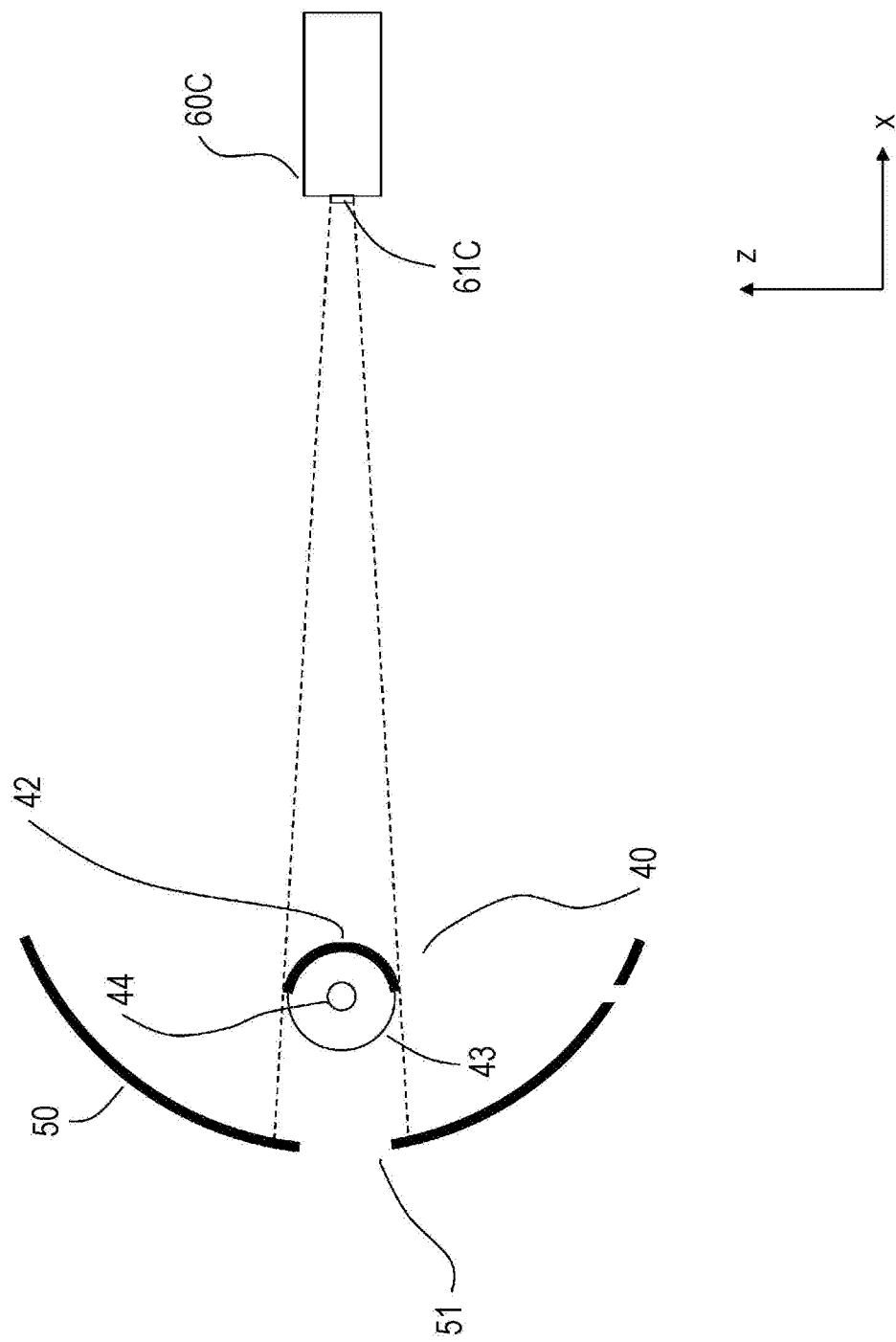
FIG. 6 is a schematic diagram of the flow cell and the oval mirror of the particle detecting device according to the first embodiment of the present invention.

Alternatively, as illustrated in FIG. 6, the hole 51 of the oval mirror 50 is disposed near the apex of the oval mirror 50, which is on the area interposed between the points of intersection of the oval mirror 50 and tangents to the outer circumference of the spherical flow cell 40 drawn from the outer ends of an effective light-receiving surface 61C of the photodetector 60C, disposed at the second focal point of the oval mirror 50. Thus, the hole 51 is hidden behind the flow cell 40 when viewed from the photodetector 60C.

The particle detecting device according to the above-described first embodiment can reflect, toward the oval mirror 50 with the hemispherical reflective film 42, the fluorescence and the scattered light that have once traveled in the direction away from the oval mirror 50 illustrated in FIG. 1, and focus the fluorescence and the scattered light to the positions of the photodetectors 60A, 60B, and 60C. Thus, the fluorescence and the scattered light that have once been omnidirectionally emitted from the particles can be focused and detected in the flow cell 40 with the efficiency equivalent to that of a lens optical focusing system.

In the particle detecting device according to the first embodiment, the hemispherical reflective film 42 is included in the flow cell 40, so that the hemispherical reflective film 42 can have a small size. Thus, the area of the portion shaded with the hemispherical reflective film 42 can be reduced. This structure improves the efficiency of focusing the fluorescence and the scattered light, and can efficiently detect weak fluorescence or scattered light without using a complex optical system including a high numerical aperture lens. The particle detecting device according to the first embodiment, which does not require a complex optical system, is easy to manufacture or adjust.

A structure including an oval mirror 50 that does not have the hole 51 and that faces the hemispherical reflective film 42 of the flow cell 40 would hinder a user from observing the inside of the through-hole 44 of the flow cell 40 from the outside. The structure including the oval mirror 50 that does not have the hole 51 would thus require disassembly of the optical system for observing the flow cell 40 or observing the portion irradiated with the inspection light.

An oval mirror 50 may have, in its side surface, an incident hole, through which the inspection light is incident, and an emergence hole, through which the inspection light emerges. In this case, observation of the flow cell 40 in the direction in which the inspection light is incident and emerges may be hindered since stray light caused by reflection and refraction of the inspection light in the flow cell 40 is emitted in the direction in which the inspection light is incident and emerges.

In contrast, in the particle detecting device according to the first embodiment, the hole 51 of the oval mirror 50 at the apex allows a user to observe the flow cell 40 and other portions. The apex of the oval mirror 50, located in a direction perpendicular to the inspection light, is less likely to be affected by the stray light caused by reflection and refraction of the inspection light in the flow cell 40. Thus, the hole 51 of the oval mirror 50 at the apex enables, for example, a user to check dirt on the inner wall of the through-hole 44 of the flow cell 40 or check whether the flow cell 40 is arranged accurately. The hole 51 of the oval mirror 50 at the apex also enables a user to check whether the inspection light is accurately applied to the flow cell 40. Alternatively, an imaging device may be used to capture an image of the flow cell 40 through the hole 51 for observation. Specifically, an imaging device may capture an image of dirt on the inner wall of the through-hole 44 of the flow cell 40 or the arrangement of the flow cell 40. Alternatively, an imaging device may capture an image of the scattered light caused from the inner wall of the through-hole 44 by the inspection light applied to the through-hole 44 of the flow cell 40.

The fluorescence and the scattered light that are caused by the particles in the flow cell 40 and that have arrived at the portion shaded by the flow cell 40 when viewed from the second focal point of the oval mirror 50 do not arrive at the second focal point of the oval mirror 50 regardless of whether the oval mirror 50 has the hole 51. Thus, the portion of the oval mirror 50 shaded by the flow cell 40 when viewed from the second focal point of the oval mirror 50 does not contribute to focusing of the fluorescence and the scattered light. Thus, the focusing performance of the oval mirror 50 is not substantially reduced by forming the hole 51 at the portion shaded by the flow cell 40 when viewed from the second focal point of the oval mirror 50. This structure thus enables observation of the flow cell 40 while substantially reducing the loss of the fluorescence and the scattered light caused by the particles in the flow cell 40.

Second Embodiment

Figure 7:
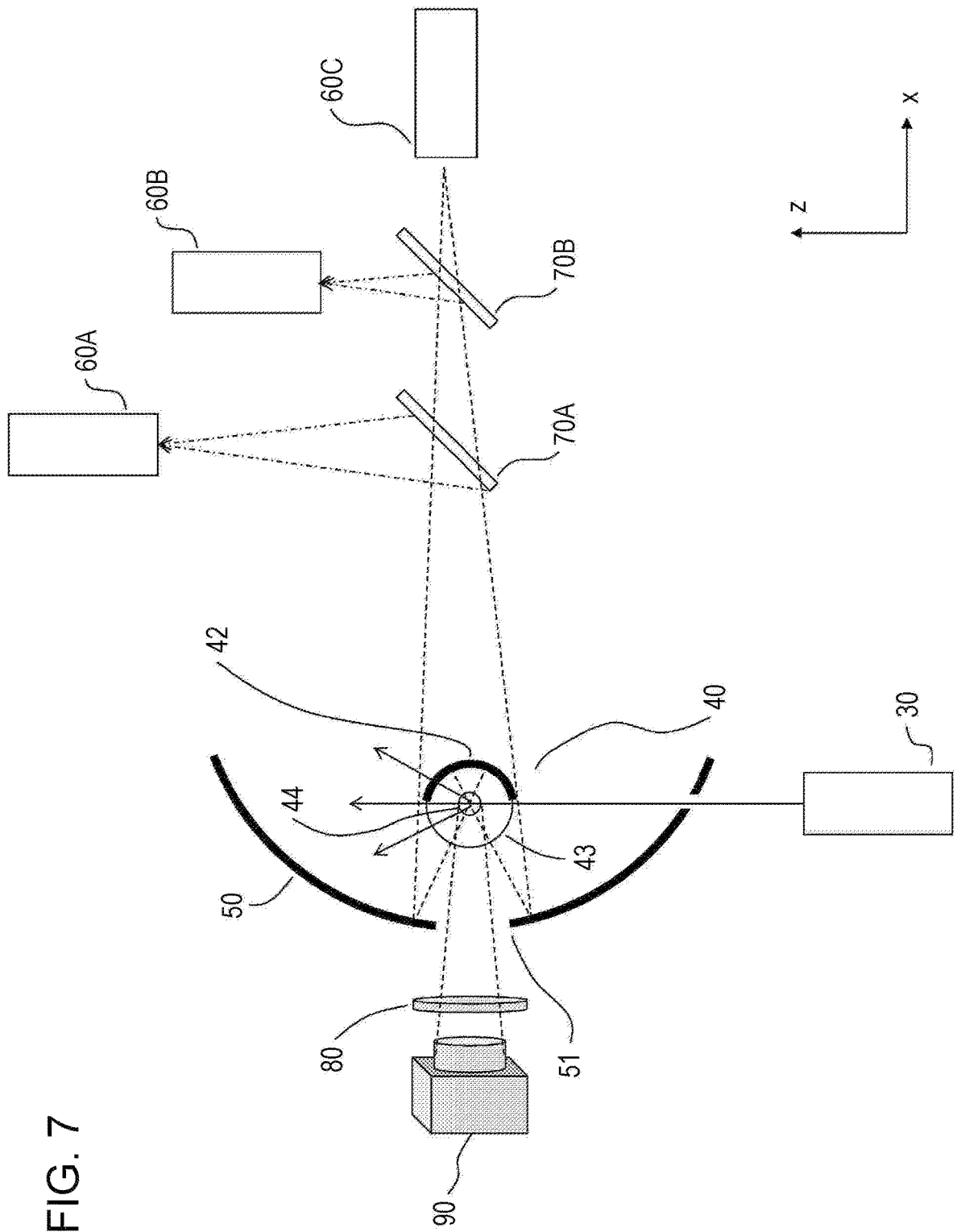
FIG. 7 is a schematic diagram of a particle detecting device according to a second embodiment of the present invention.

As illustrated in FIG. 7, a particle detecting device according to a second embodiment also includes an imaging device 90 and a wavelength filter 80. The imaging device 90 captures, through the hole 51 of the oval mirror 50 at the apex, an image of the shape of reaction light caused by inspection light that crosses the fluid in the flow cell 40. The wavelength filter 80 is disposed between the hole 51 and the imaging device 90 to transmit Raman scattered light therethrough in a wavelength selective manner without transmitting the inspection light. Examples usable as the wavelength filter 80 include a band-pass filter and a long-pass filter.

In the particle detecting device according to the second embodiment, to inspect whether at least one of the position of an optical system, for example, the inspection light source 30, an optical path of the inspection light including the incident position and the angle of incidence of the inspection light on the flow cell 40, the focal point of the inspection light, and the position of the flow cell 40 is accurate, an appropriate liquid is caused to flow through or filled into the through-hole 44 of the flow cell 40. An example of an appropriate liquid is a liquid containing water. A liquid containing water may only contain water. A liquid containing water does not have to contain particles. For example, ethanol is also usable as an appropriate liquid. When an appropriate liquid is irradiated with the inspection light, Raman scattered light occurs in the liquid as reaction light. Raman scattered light has a wavelength different from the wavelength of the inspection light, or longer than the wavelength of the inspection light. Raman scattered light occurs at a position at which the inspection light crosses the appropriate liquid. The shape of the Raman scattered light thus coincides with the optical path of the inspection light that crosses the liquid. Raman scattered light does not occur at a portion at which an appropriate liquid is absent.

The imaging device 90 captures an image of Raman scattered light in a direction of the major axis of the oval mirror 50, which is perpendicular to the inspection light travel direction and to the longitudinal direction of the through-hole 44 of the flow cell 40, through the hole 51 of the oval mirror 50 at the apex. The imaging device 90 then outputs image data.

Figure 8:
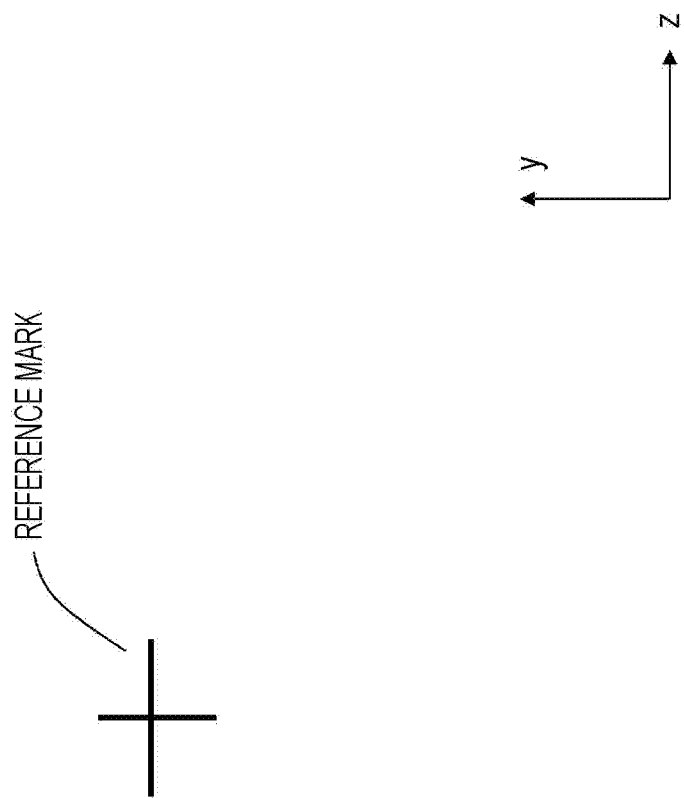
FIG. 8 is a schematic diagram of a reference mark according to the second embodiment of the present invention.
Figure 9:
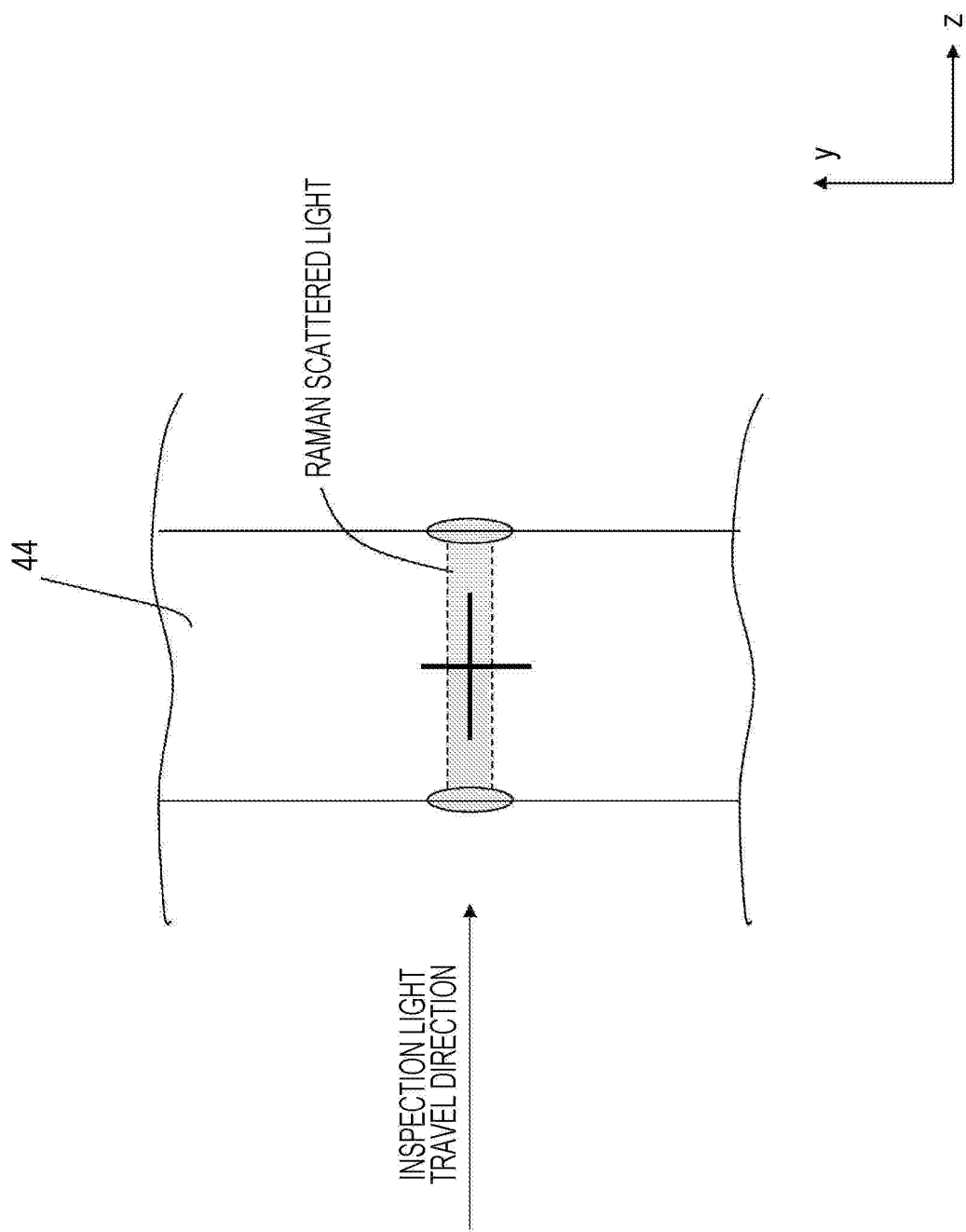
FIG. 9 is a schematic diagram of a shape of reaction light (Raman scattered light) according to the second embodiment of the present invention.

The imaging device 90 has such a setting as to superpose a reference mark of a predetermined shape illustrated in FIG. 8 on the captured image. The reference mark has a shape of, for example, a cross. The reference mark is set so that the point of intersection of the cross illustrated in FIG. 8 coincides with the focal point of the inspection light when the through-hole 44 of the flow cell 40 illustrated in FIG. 7 and the focal point of the inspection light are disposed at accurate positions. The reference mark is also set so that the horizontal line of the cross illustrated in FIG. 8 is superposed on the optical path of the inspection light when the through-hole 44 of the flow cell 40 and the focal point of the inspection light are disposed at accurate positions. Thus, as illustrated in FIG. 9, the imaging device 90 captures an image of segment-shaped Raman scattered light that is superposed on the horizontal line of the cross and that has a center coinciding with the point of intersection of the cross. Although FIG. 9 schematically illustrates the through-hole 44 of the flow cell 40, the imaging device 90 only has to capture an image of Raman scattered light.

Figure 10:
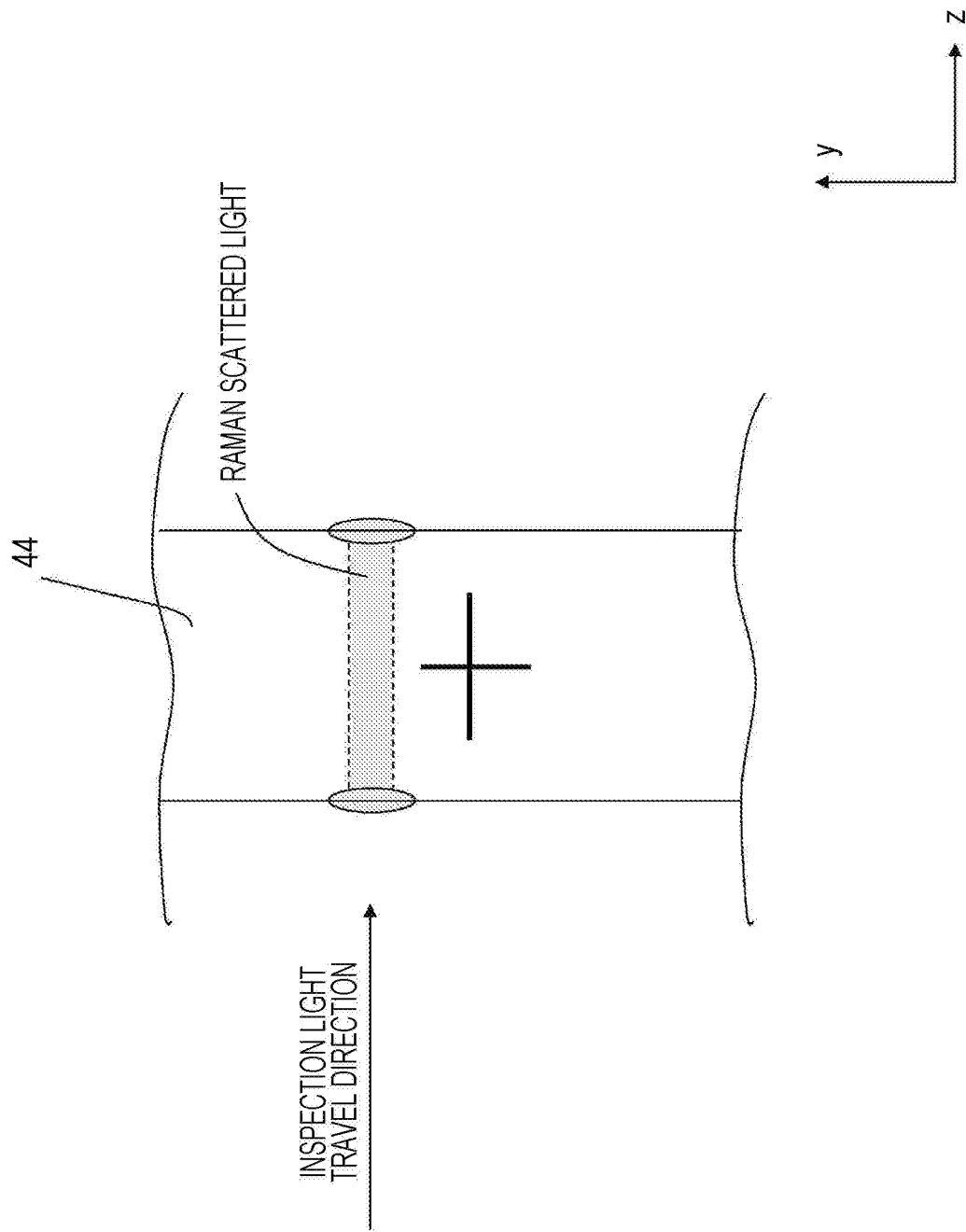
FIG. 10 is a schematic diagram of a shape of reaction light (Raman scattered light) according to the second embodiment of the present invention.
Figure 11:
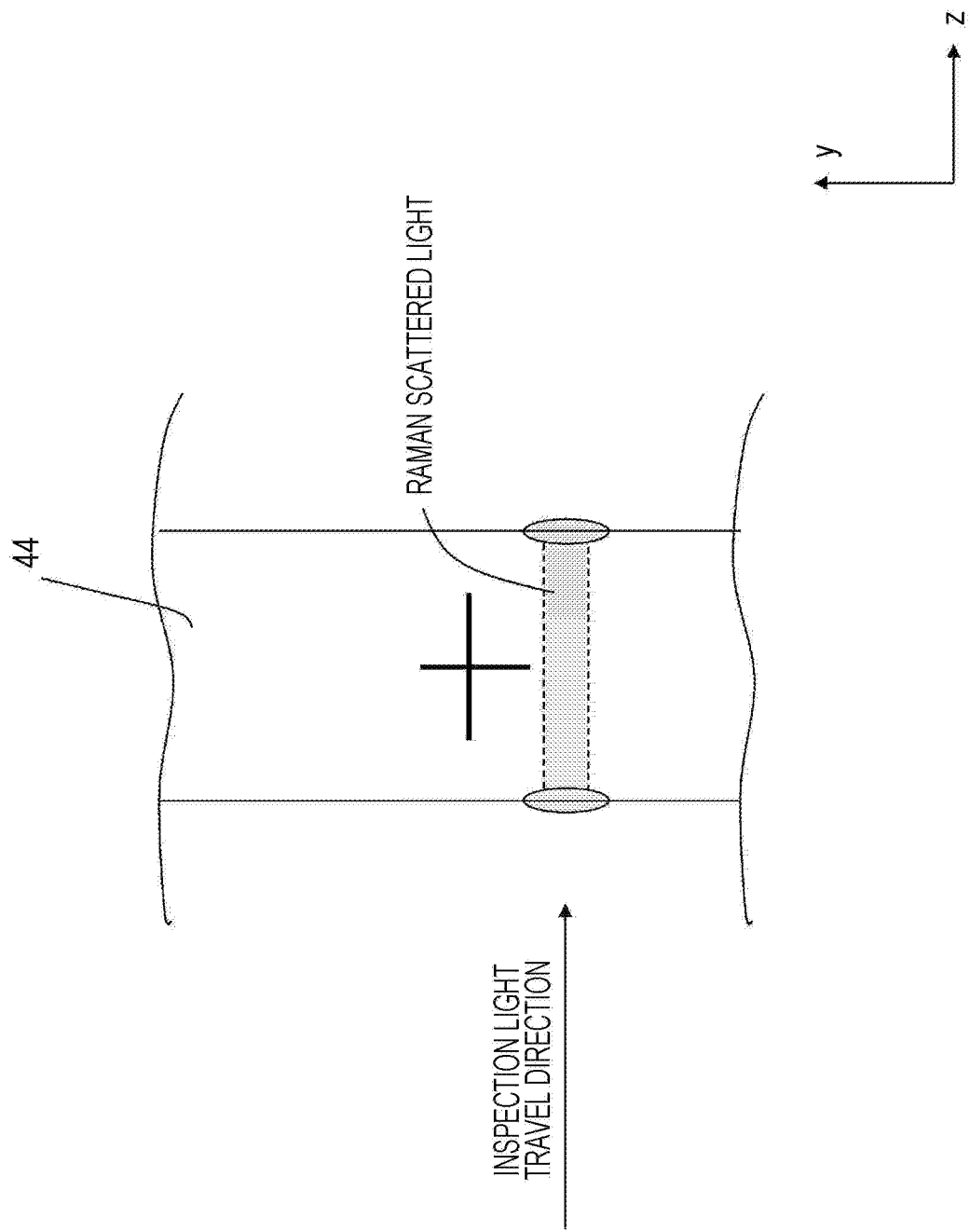
FIG. 11 is a schematic diagram of a shape of reaction light (Raman scattered light) according to the second embodiment of the present invention.

When the optical path of the inspection light deviates vertically upward of and parallel with the intended optical path, as illustrated in FIG. 10, the imaging device 90 captures an image of Raman scattered light at a portion above the horizontal line of the cross. When the optical path of the inspection light deviates vertically downward of and parallel with the intended optical path, as illustrated in FIG. 11, the imaging device 90 captures an image of Raman scattered light at a portion below the horizontal line of the cross.

When the imaging device 90 captures an image of Raman scattered light deviating in the vertical direction, for example, the position of the inspection light source 30 is moved in the vertical direction to compensate for the deviation. The amount by which the inspection light source 30 is moved is calculated from, for example, the magnification of the lens of the imaging device 90 and the deviation in the vertical direction between Raman scattered light and the horizontal line of the cross in the image captured by the imaging device 90.

Figure 12:
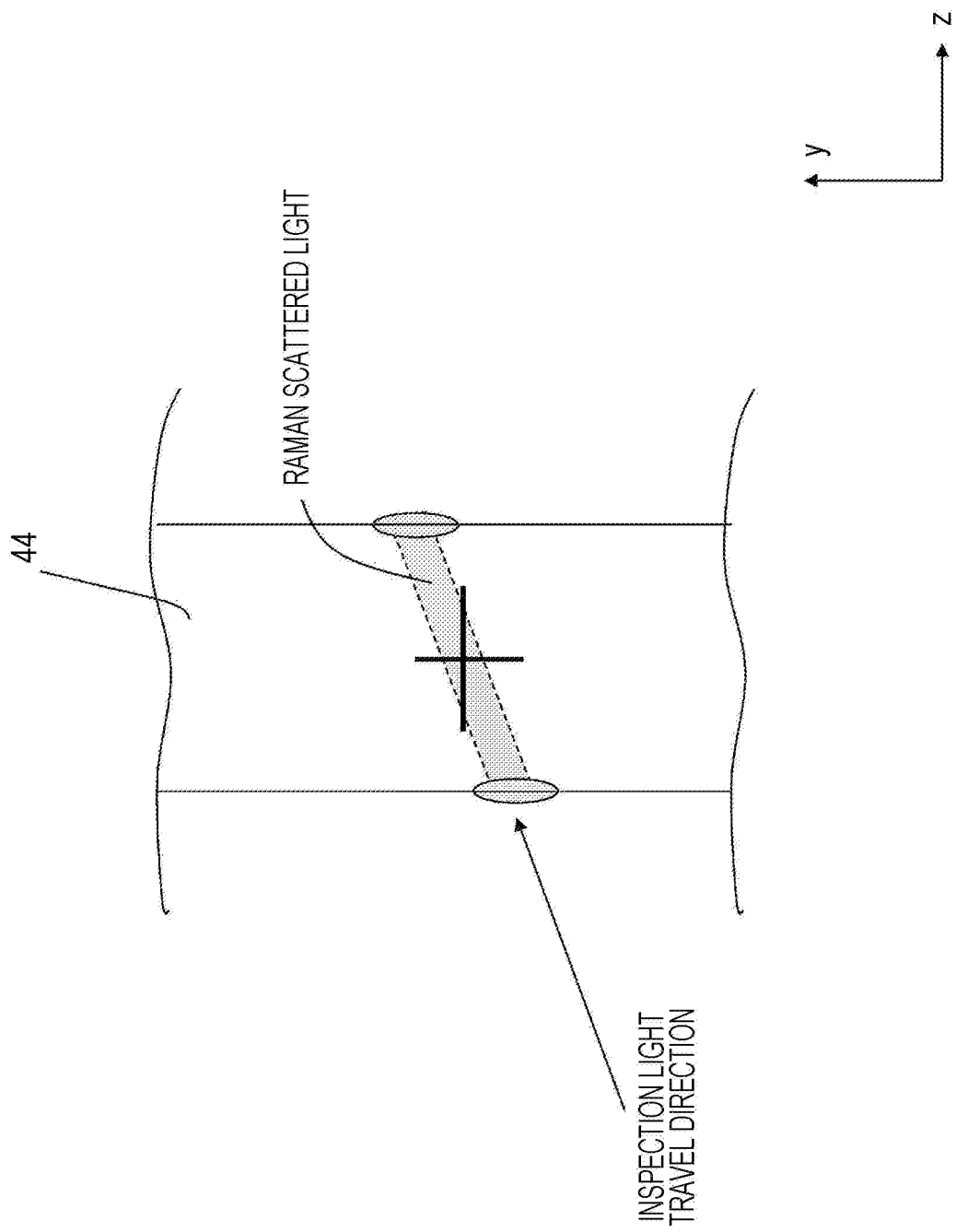
FIG. 12 is a schematic diagram of a shape of reaction light (Raman scattered light) according to the second embodiment of the present invention.
Figure 13:
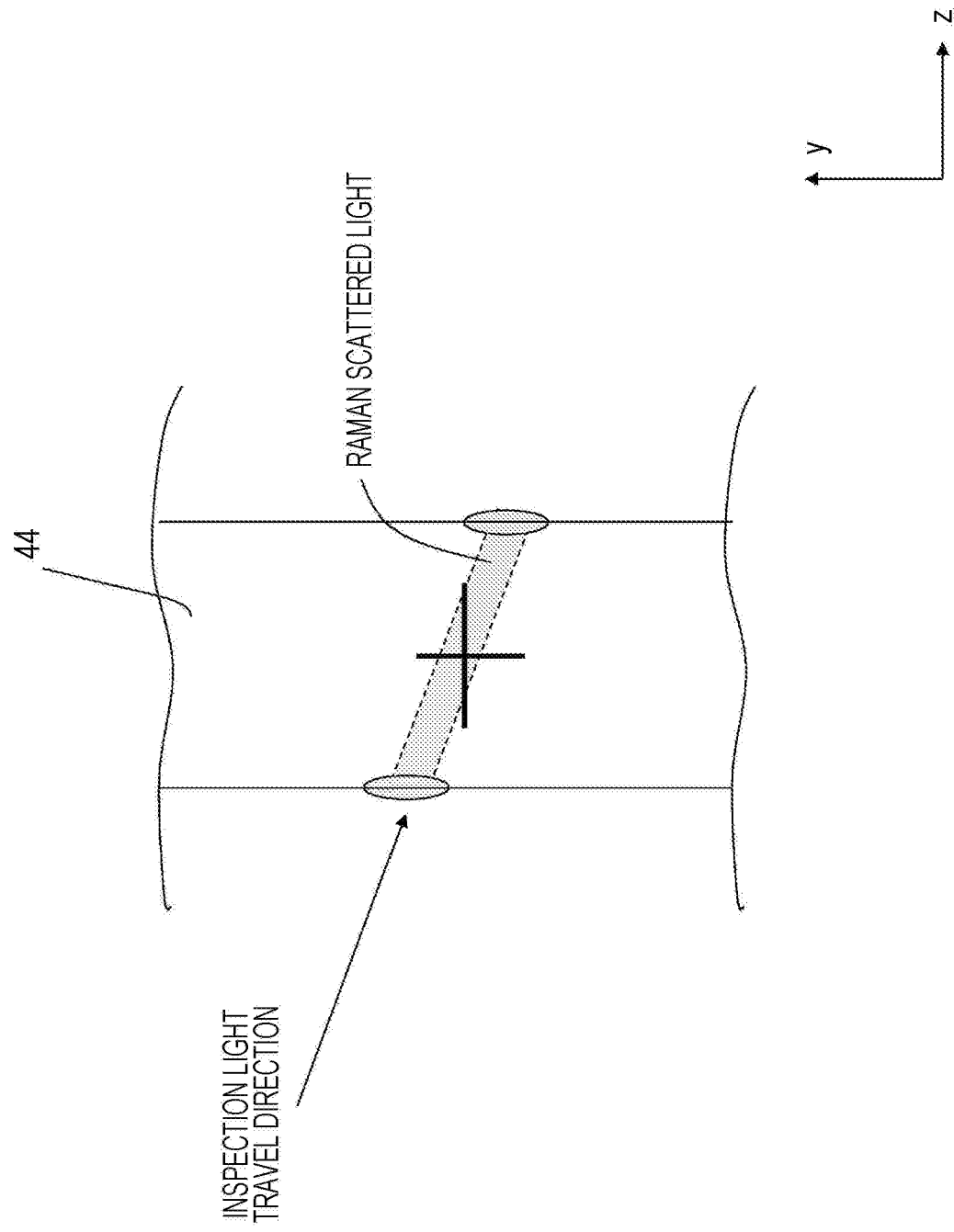
FIG. 13 is a schematic diagram of a shape of reaction light (Raman scattered light) according to the second embodiment of the present invention.

When the optical path of the inspection light is inclined vertically upward of the intended optical path, as illustrated in FIG. 12, the imaging device 90 captures an image of Raman scattered light inclined upward with respect to the horizontal line of the cross. When the optical path of the inspection light is inclined vertically downward of the intended optical path, as illustrated in FIG. 13, the imaging device 90 captures an image of Raman scattered light inclined downward with respect to the horizontal line of the cross.

When the imaging device 90 captures an image of Raman scattered light inclined downward, for example, the inspection light source 30 is inclined to compensate for the inclination of Raman scattered light. The amount by which the inspection light source 30 is inclined can be calculated from, for example, the deviation of the positions of both ends of the segment-shaped Raman scattered light and the angle of the segment-shaped Raman scattered light with respect to the horizontal line of the cross.

Figure 14:
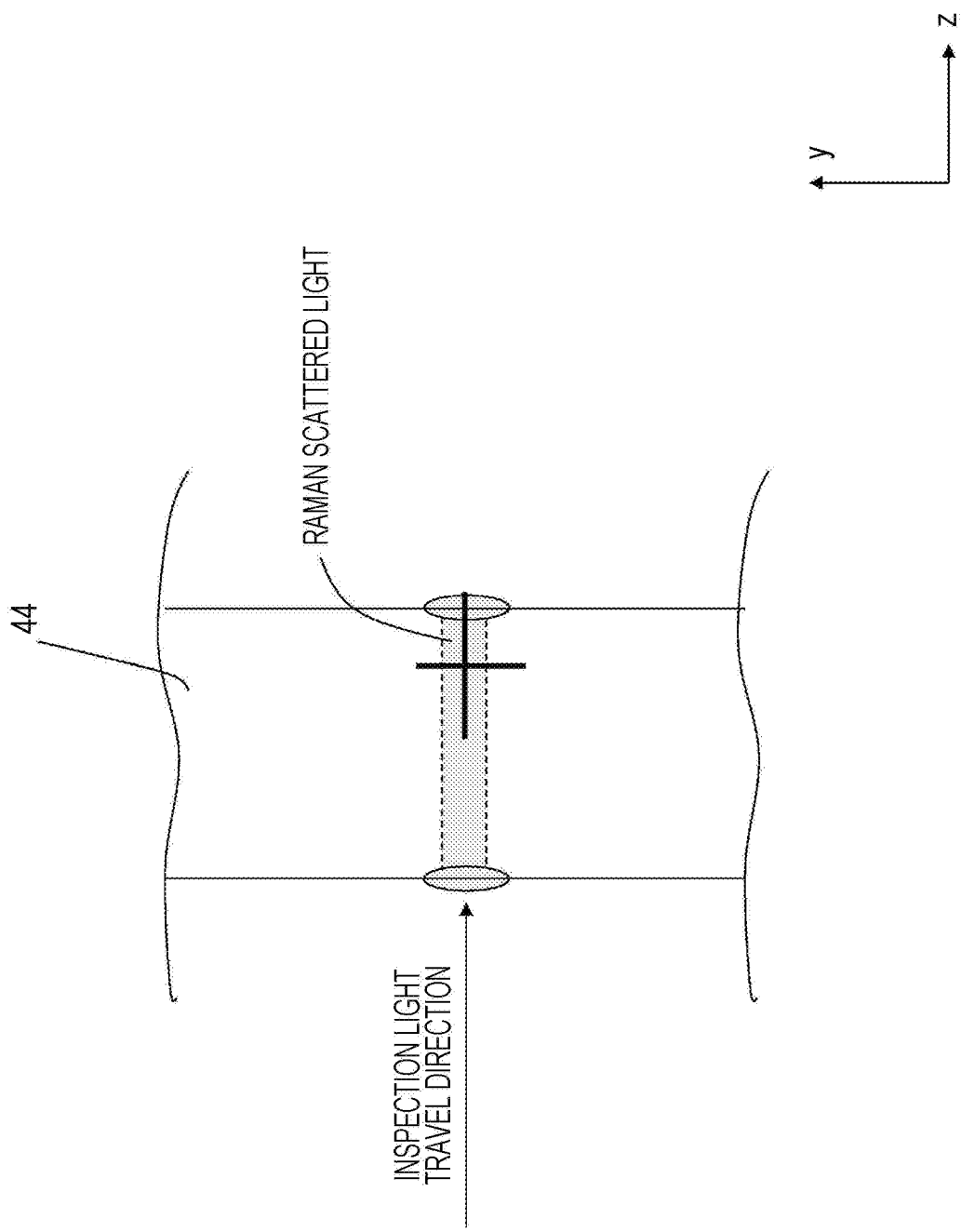
FIG. 14 is a schematic diagram of a shape of reaction light (Raman scattered light) according to the second embodiment of the present invention.

When the through-hole 44 of the flow cell 40 deviates in the direction the same as the inspection light travel direction or in the direction opposite to the inspection light travel direction, as illustrated in FIG. 14, the imaging device 90 captures an image in which the point of intersection of the cross and the center of the segment-shaped Raman scattered light are misaligned with each other. When such an image is captured, the through-hole 44 of the flow cell 40 is moved to compensate for the misalignment. The amount by which the through-hole 44 of the flow cell 40 is moved can be calculated from, for example, the misalignment between the center of the segment-shaped Raman scattered light and the point of intersection of the cross of the image captured by the imaging device 90.

Figure 15:
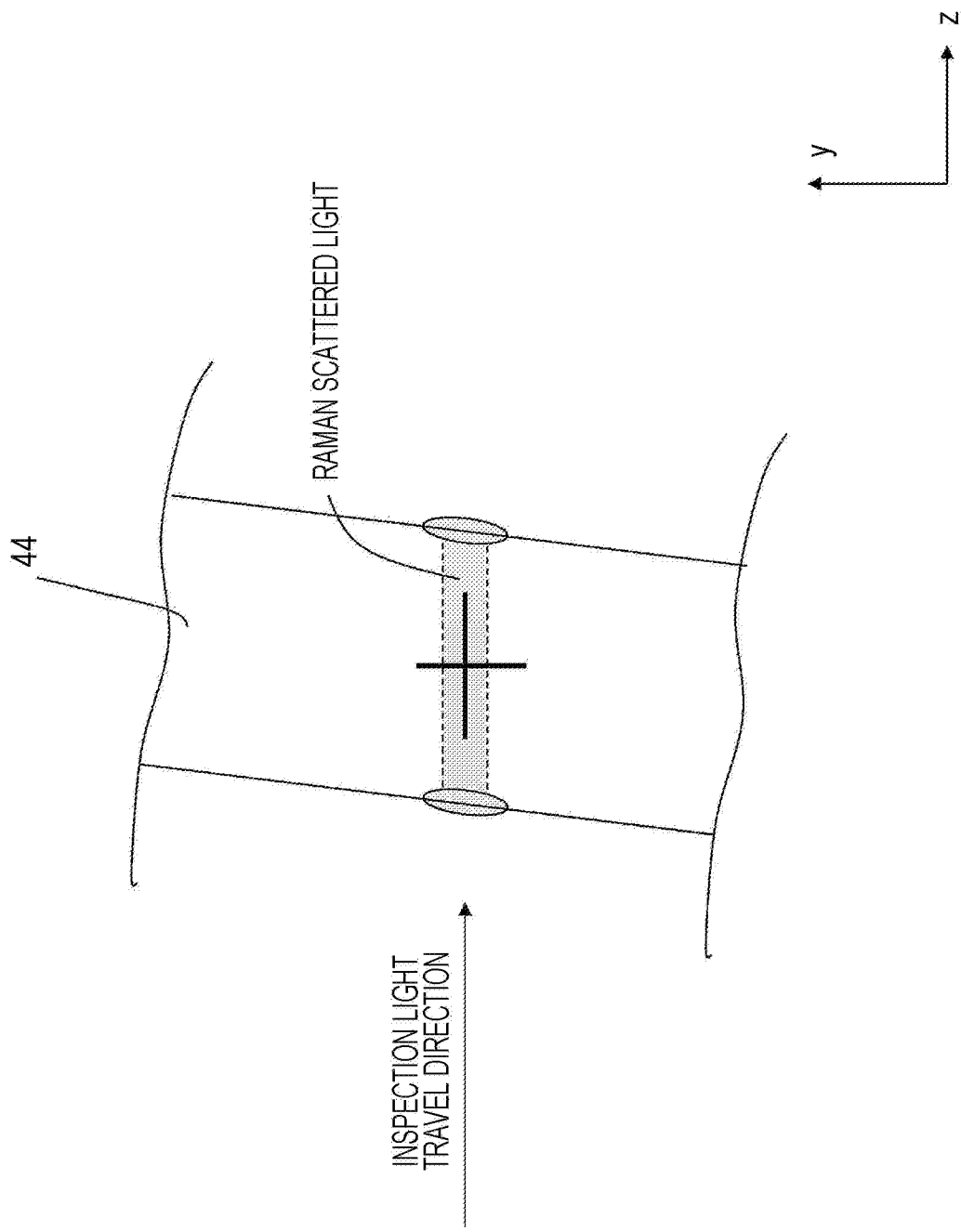
FIG. 15 is a schematic diagram of a shape of reaction light (Raman scattered light) according to the second embodiment of the present invention.

When the through-hole 44 of the flow cell 40 is inclined, as illustrated in FIG. 15, both ends of the segment-shaped Raman scattered light corresponding to the incidence point and the emergence point of inspection light may be inclined, or the segment-shaped Raman scattered light may have a length larger than the width of the through-hole 44 perpendicular to the longitudinal direction. When such an image is captured, for example, the inclination of the through-hole 44 of the flow cell 40 is corrected to compensate for the inclination of both ends of the segment-shaped Raman scattered light or so that the length of the segment-shaped Raman scattered light coincides with the width of the through-hole 44.

Figure 16:
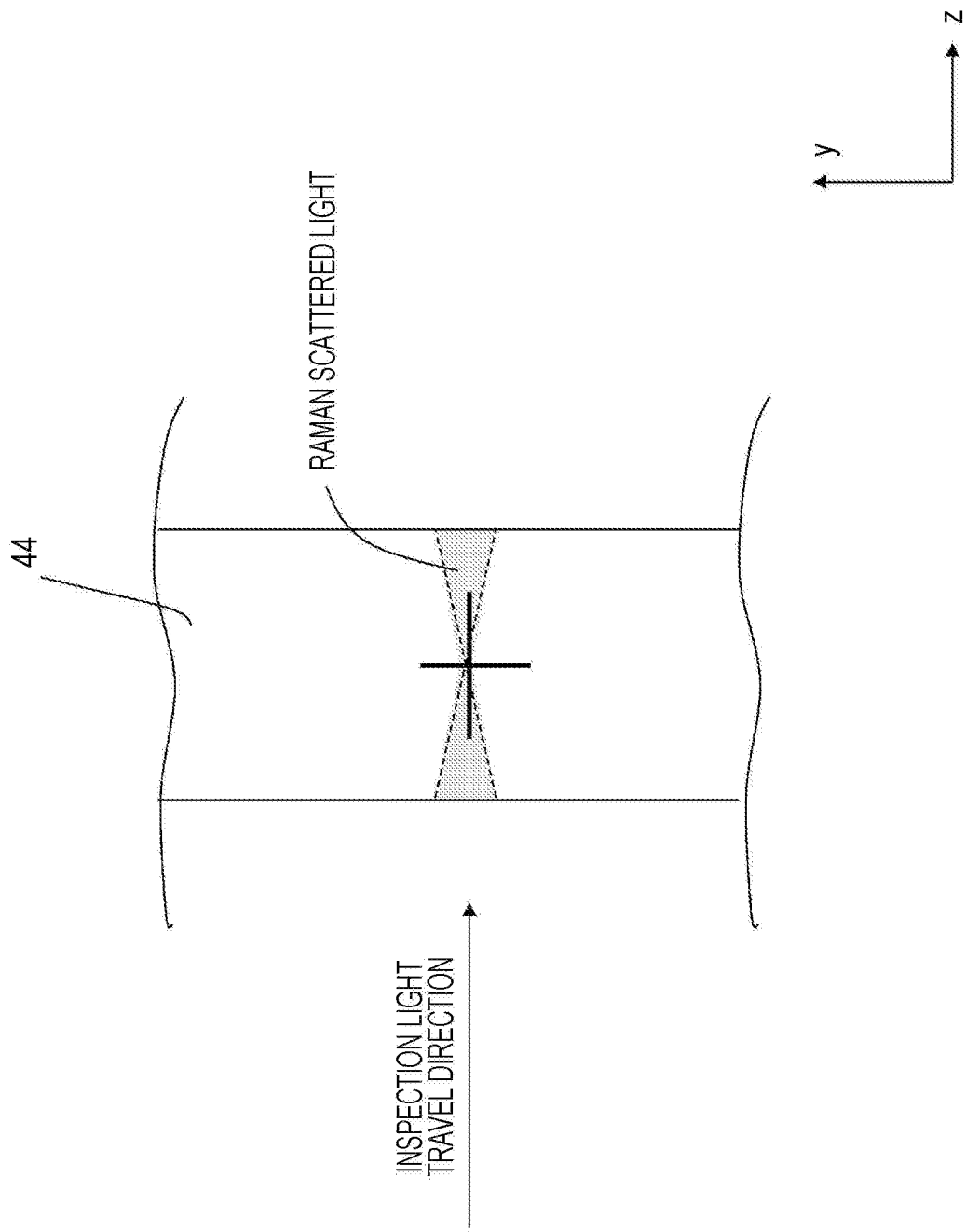
FIG. 16 is a schematic diagram of a shape of reaction light (Raman scattered light) according to the first embodiment of the present invention.

As illustrated in FIG. 16, the inspection light is narrowed at most and causes strong Raman scattered light at the focal point of the inspection light. Thus, for example, whether the position of the inspection light source 30 is accurate may be determined by comparing the point of intersection of the cross in the image captured by the imaging device 90 with the point at which Raman scattered light is narrowed at most or the point at which Raman scattered light has highest intensity. When the point of intersection of the cross in the image captured by the imaging device 90 deviates from the point at which Raman scattered light is narrowed at most or the point at which Raman scattered light has highest intensity, the inspection light source 30 or another component is moved to compensate for the deviation.

When the focal point of the inspection light is designed to be on the center axis of the through-hole 44 of the flow cell

Figure 17:
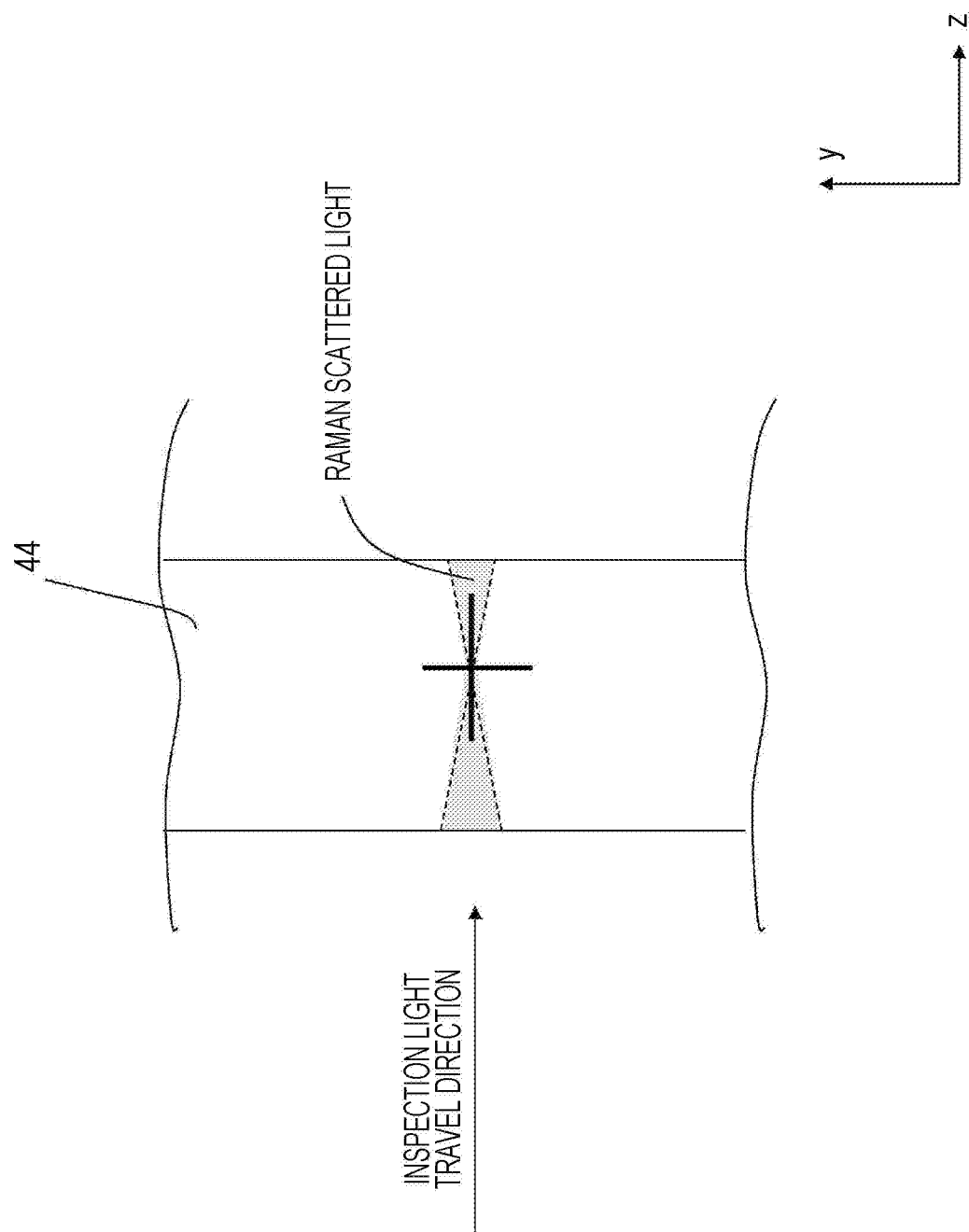
FIG. 17 is a schematic diagram of a shape of reaction light (Raman scattered light) according to the second embodiment of the present invention.

40, as illustrated in FIG. 16, Raman scattered light occurs bilateral symmetrically with respect to the focal point of the inspection light. On the other hand, when the flow cell 40 deviates in the inspection light travel direction, as illustrated in FIG. 17, Raman scattered light appears bilateral asymmetrically with respect to the focal point of the inspection light. In this case, the flow cell 40 is moved to cause Raman scattered light bilateral symmetrically with respect to the focal point of the inspection light.

Figure 18:
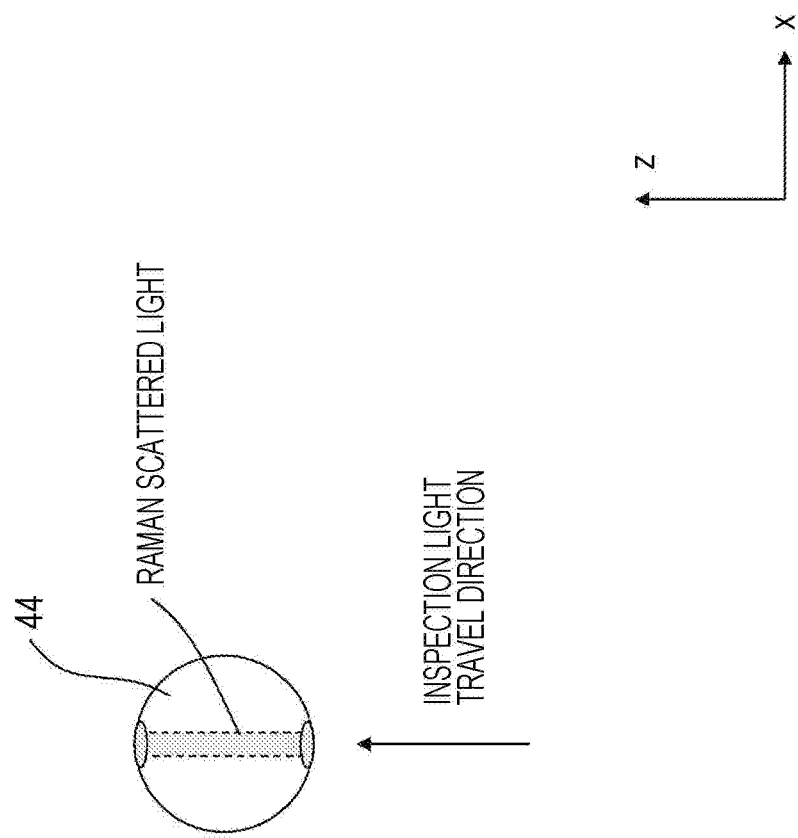
FIG. 18 is a schematic diagram of a shape of reaction light (Raman scattered light) according to the second embodiment of the present invention.
Figure 19:
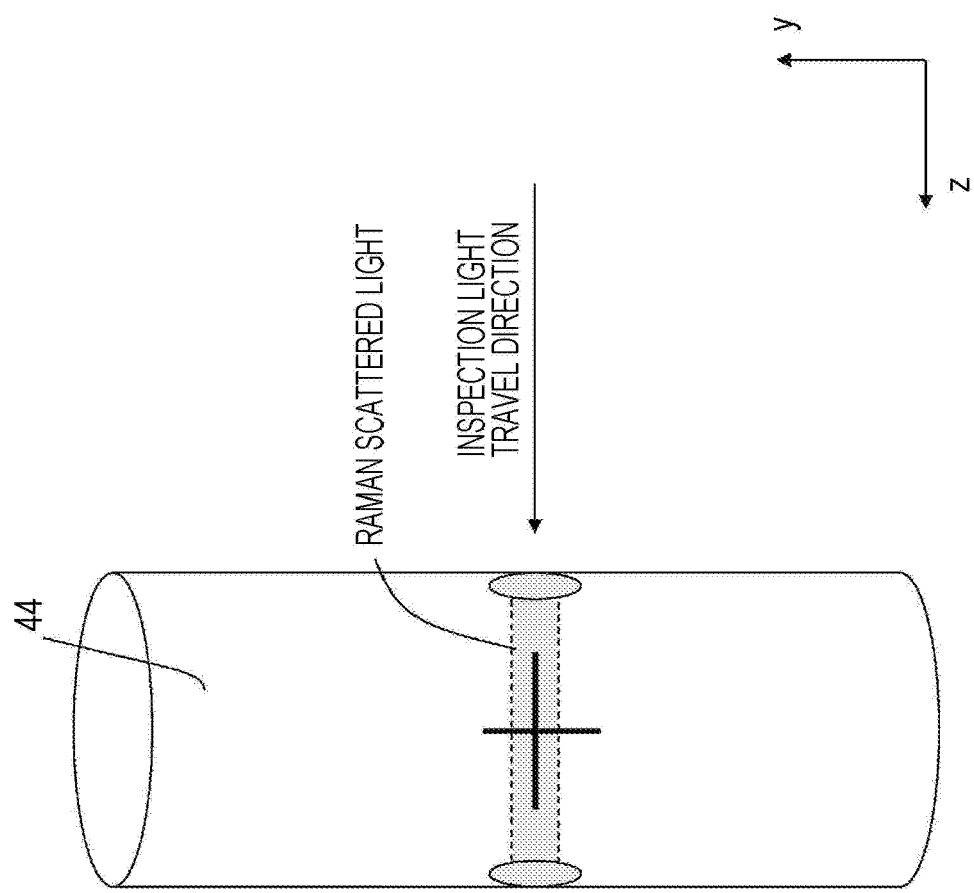
FIG. 19 is a schematic diagram of a shape of reaction light (Raman scattered light) according to the second embodiment of the present invention.
Figure 20:
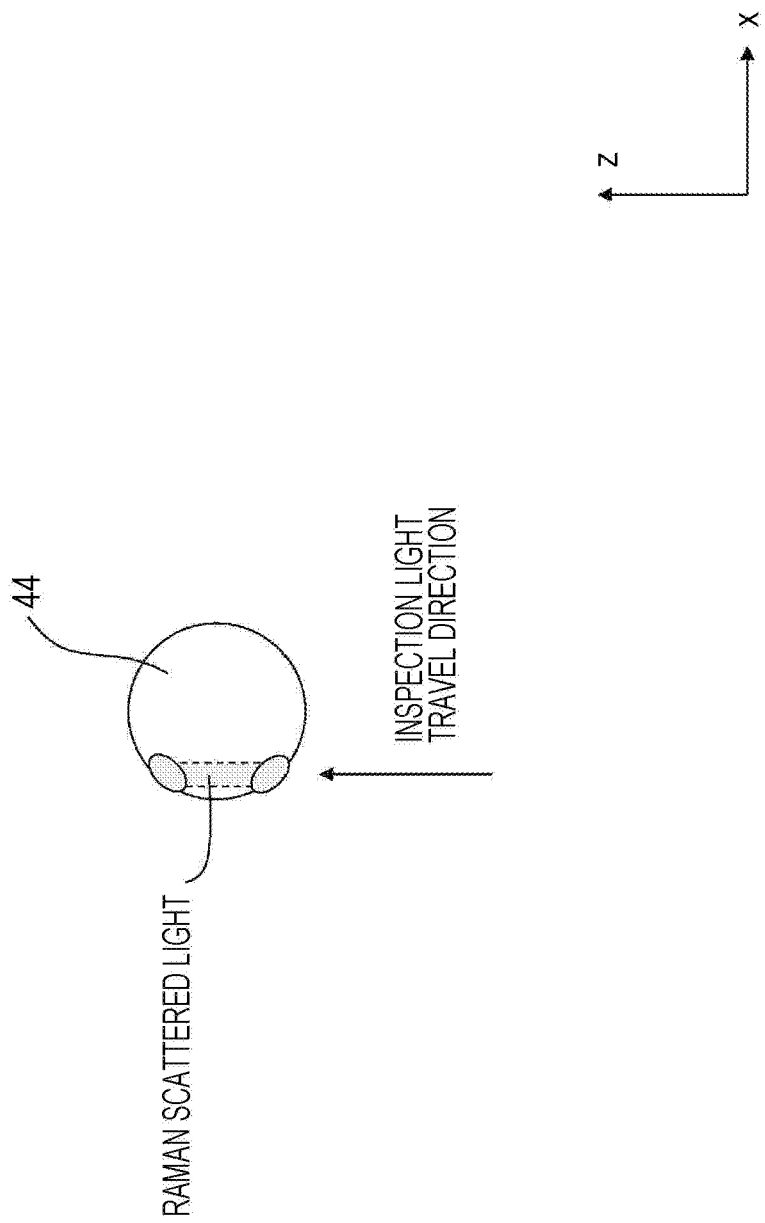
FIG. 20 is a schematic diagram of a shape of reaction light (Raman scattered light) according to the second embodiment of the present invention.
Figure 21:
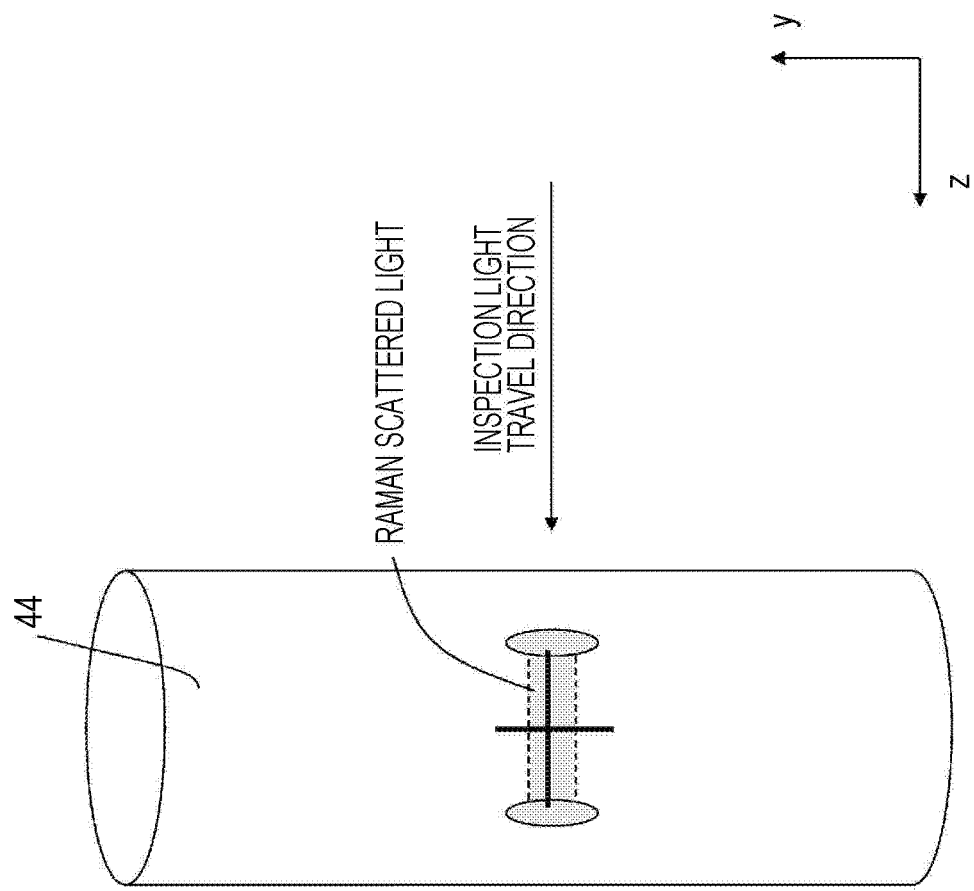
FIG. 21 is a schematic diagram of a shape of reaction light (Raman scattered light) according to the second embodiment of the present invention.

When the through-hole 44 of the flow cell 40 has a circular cross section and, as illustrated in FIG. 18, the inspection light is designed to pass through the center of the through-hole 44, the shape of Raman scattered light has a length substantially equal to the diameter of the through-hole 44, as illustrated in FIG. 19. On the other hand, as illustrated in FIG. 20, when the optical path of the inspection light deviates from the center of the through-hole 44, the shape of Raman scattered light has a length smaller than the diameter of the through-hole 44, as illustrated in FIG. 21.

When an image of Raman scattered light having a shape shorter than the diameter of the through-hole 44 is captured, the position of the optical system including the inspection light source 30 or the flow cell 40 is moved so that the length of the shape of Raman scattered light substantially coincides with the diameter of the through-hole 44. The amount of movement can be calculated on the basis of, for example, the magnification of the lens of the imaging device 90 or the ratio of the length of the shape of Raman scattered light to the diameter of the through-hole 44.

Figure 22:
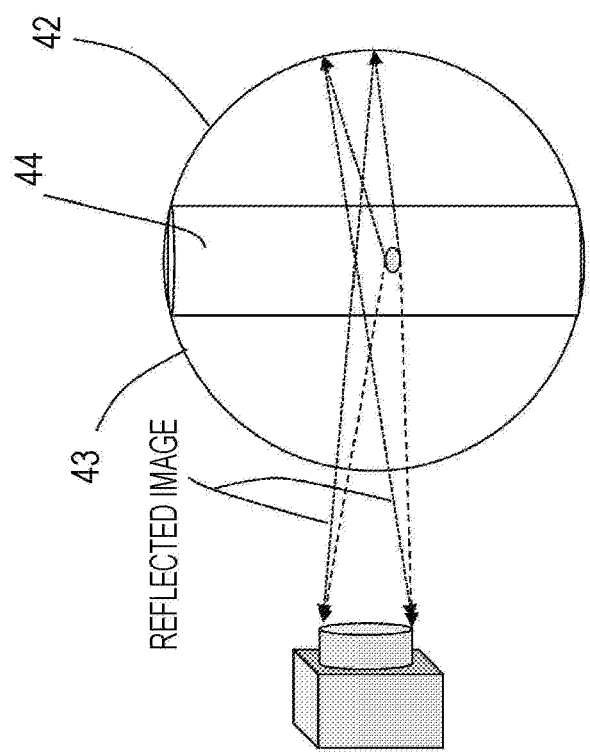
FIG. 22 is a schematic diagram of a shape of reaction light (Raman scattered light) according to the second embodiment of the present invention.
Figure 23:
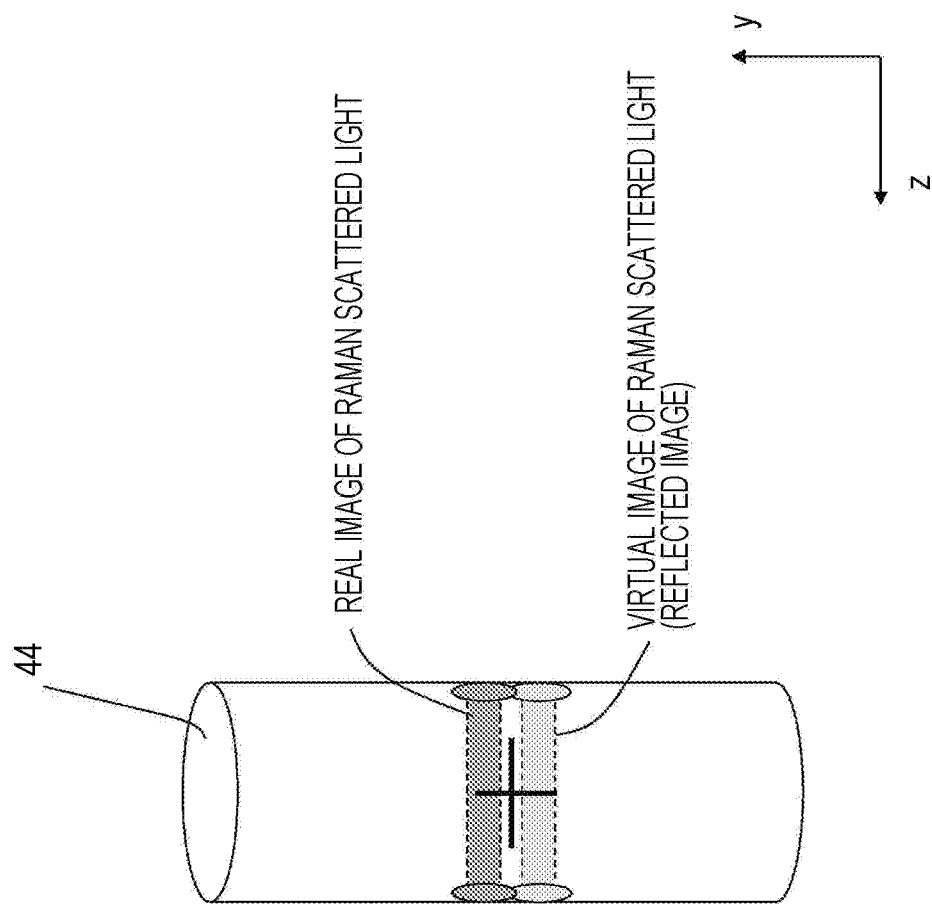
FIG. 23 is a schematic diagram of a shape of reaction light (Raman scattered light) according to the second embodiment of the present invention.

When the inspection light deviates from the center of the spherical flow cell 40, as illustrated in FIG. 22, the shape of Raman scattered light that emerges from the surface of the hemispherical lens 43 without passing through the hemispherical reflective film 42 is misaligned with the shape of reflected light of the Raman scattered light that emerges from the surface of the hemispherical lens 43 after passing through the hemispherical reflective film 42, as illustrated in FIG. 23. In this case, the position of the optical system including the inspection light source 30 or the flow cell 40 is moved so that the shape of Raman scattered light that emerges from the surface of the hemispherical lens 43 without passing through the hemispherical reflective film 42 is superposed on the shape of reflected light of Raman scattered light that emerges from the surface of the hemispherical lens 43 after passing through the hemispherical reflective film 42.

In the particle detecting device according to the above-described second embodiment, capturing of an image of the shape of Raman scattered light enables grasping of at least one of the position of the optical system, for example, the inspection light source 30 illustrated in FIG. 7, the optical path of the inspection light including the incident position and the angle of incidence of the inspection light on the flow cell, the focal point of the inspection light, and the position of the flow cell 40. The position or angle of the inspection light optical system or the flow cell 40 can be adjusted on the basis of the grasped at least one of the position of the inspection light source 30, the optical path of the inspection light including the incident position and the angle of incidence of the inspection light on the flow cell 40, the focal point of the inspection light, and the position of the flow cell 40.

In the particle detecting device according to the second embodiment, capturing of an image of the shape of Raman scattered light enables, for example, concurrent grasping of any two or more of the position of the inspection light source 30, the optical path of the inspection light including the incident position and the angle of incidence of the inspection light on the flow cell 40, the focal point of the inspection light, and the position of the flow cell 40.

The particle detecting device according to the second embodiment does not require flowing of a fluid containing particles through the flow cell 40 to inspect the optical system of the particle detecting device. Thus, the particles used for inspection are prevented from being left on the passage including the flow cell 40. In addition, the effect of stray light caused by the inspection light can be reduced by observing, in a wavelength selective manner, inspection light and Raman scattered light having a wavelength different from the wavelength of scattered light the same as the wavelength of the inspection light.

Third Embodiment

In the particle detecting device according to the second embodiment, an example is described in which, to inspect the optical system, an appropriate liquid is caused to flow through or filled into the through-hole 44 of the flow cell 40 illustrated in FIG. 7, and an image of Raman scattered light is captured. In contrast, in a third embodiment, to inspect the optical system, a liquid containing fluorochrome that is excited by the inspection light is caused to flow through or filled into the through-hole 44 of the flow cell 40 illustrated in FIG. 7.

In the third embodiment, the wavelength filter 80 disposed between the hole 51 and the imaging device 90 transmits fluorescence therethrough in a wavelength selective manner without transmitting the inspection light.

Fluorochrome may be any material that fluoresces in response to inspection light as excitation light. Examples usable as fluorochrome include riboflavin and a fluorescence dye. The liquid containing fluorochrome does not have to contain particles. When the liquid containing fluorochrome is irradiated with the inspection light, fluorescence occurs in the liquid as reaction light. Fluorescence occurs at a portion at which the inspection light crosses the liquid containing fluorochrome. Thus, the shape of fluorescence coincides with the optical path of the inspection light that crosses the liquid. Fluorescence does not occur at a portion at which the liquid containing fluorochrome is absent.

In the particle detecting device according to the third embodiment, the fluorescence shape of an image captured by the imaging device 90 enables grasping of at least one of the position of the optical system, for example, the inspection light source 30 illustrated in FIG. 7, the optical path of the inspection light including the incident position and the angle of incidence of the inspection light on the flow cell, the focal point of the inspection light, and the position of the flow cell 40.

Fourth Embodiment

In a fourth embodiment, to inspect the optical system, a liquid containing particles is caused to flow through or filled into the through-hole 44 of the flow cell 40 illustrated in FIG. 7. In the fourth embodiment, the wavelength filter 80 may be omitted.

When the liquid containing particles is irradiated with the inspection light, Mie scattered light occurs as reaction light. Mie scattered light occurs at a portion at which the inspection light crosses the liquid containing particles. Thus, the shape of the Mie scattered light coincides with the optical path of the inspection light that crosses the liquid. The Mie scattered light does not occur at a portion at which the liquid containing particles are absent.

In the particle detecting device according to the fourth embodiment, the Mie scattered light shape of an image captured by the imaging device 90 enables grasping of at least one of the position of the optical system, for example, the inspection light source 30 illustrated in FIG. 7, the optical path of the inspection light including the incident position and the angle of incidence of the inspection light on the flow cell, the focal point of the inspection light, and the position of the flow cell 40.

Other Embodiments

The embodiments of the present invention have been described thus far, but the description and the drawings that constitute part of the disclosure should not be construed as limiting the present invention. Various other embodiments, examples, and application techniques would be clear to a person having ordinary skill in the art from this disclosure. For example, FIG. 7 illustrates an example of a particle detecting device including the imaging device 90 that captures, through the hole 51 of the oval mirror 50 at the apex, an image of reaction light caused by the inspection light that crosses the fluid in the flow cell 40. In contrast, the particle detecting device may include an inspection photodetector that detects, through the hole of the oval mirror at the apex, the intensity of reaction light caused by the inspection light that crosses the fluid in the flow cell. The inspection photodetector can detect whether the flow cell is accurately irradiated with the inspection light by observing the intensity of the reaction light emitted from the flow cell. It should thus be understood that the present invention includes various embodiments not described herein.

REFERENCE SIGNS LIST 30 inspection light source
40 flow cell
41 spherical member
42 hemispherical reflective film
43 hemispherical lens
44 through-hole
50 oval mirror
51 hole
60A, 60B, 60C photodetector
61C effective light-receiving surface
70A, 70B wavelength-selective reflecting mirror
70B wavelength-selective reflecting mirror
90 imaging device

The invention claimed is:

1. A particle detecting device, comprising:
an inspection light source that emits inspection light;
a flow cell that is irradiated with the inspection light; and
an oval mirror that has a first focal point at a position of the flow cell, the oval mirror having a hole at an apex of the oval mirror.

2. The particle detecting device according to claim 1, wherein the hole is disposed in an area interposed between points of intersection of the oval mirror and tangents to an outer circumference of the flow cell passing through a second focal point of the oval mirror.

3. The particle detecting device according to claim 1, wherein the hole is disposed in an area interposed between points of intersection of the oval mirror and tangents to an outer circumference of the flow cell passing through outer ends of a light-receiving surface of a photodetector disposed at a second focal point of the oval mirror.

4. The particle detecting device according to claim 1, wherein the flow cell includes a hemispherical reflective film that reflects light, and a hemispherical lens that transmits therethrough light reflected by the hemispherical reflective film.

5. The particle detecting device according to claim 1, further comprising:
an imaging device that captures an image of the flow cell through the hole of the oval mirror at the apex.

6. The particle detecting device according to claim 1, further comprising:
an imaging device that captures, through the hole of the oval mirror at the apex, an image of a shape of reaction light caused by the inspection light that crosses a fluid in the flow cell.

7. The particle detecting device according to claim 1, further comprising:
an inspection photodetector that detects, through the hole of the oval mirror at the apex, reaction light caused by the inspection light that crosses a fluid in the flow cell.

8. A method for inspecting a particle detecting device, comprising:
observing a flow cell through a hole of an oval mirror at an apex of the oval mirror, the oval mirror having a first focal point at a position of the flow cell.

9. The method for inspecting a particle detecting device according to claim 8, wherein the hole is disposed in an area interposed between points of intersection of the oval mirror and tangents to an outer circumference of the flow cell passing through a second focal point of the oval mirror.

10. A method for inspecting a particle detecting device, comprising:
observing a flow cell through a hole of an oval mirror at an apex of the oval mirror, the oval mirror having a first focal point at a position of the flow cell, wherein the hole is disposed in an area interposed between points of intersection of the oval mirror and tangents to an outer circumference of the flow cell passing through outer ends of a light-receiving surface of a photodetector disposed at a second focal point of the oval mirror.

* * * * *